(12) United States Patent
Rana et al.

(10) Patent No.: US 7,891,643 B2
(45) Date of Patent: Feb. 22, 2011

(54) MULTIPLE STOP GAS COMPRESSION SPRING

(75) Inventors: Paresh Rana, Clawson, MI (US); Aaron Schnepp, Shelby Township, MI (US); Louis A. Rhodes, Farmington Hills, MI (US); George Konstantakopoulos, Birmingham, MI (US); Robert S. Smyczynski, Metamora, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 716 days.

(21) Appl. No.: 11/853,217

(22) Filed: Sep. 11, 2007

(65) Prior Publication Data

US 2009/0065988 A1 Mar. 12, 2009

(51) Int. Cl.
*F16F 5/00* (2006.01)
(52) U.S. Cl. .................................. 267/64.12; 188/300
(58) Field of Classification Search ................. 188/300; 267/64.12, 120
See application file for complete search history.

(56) References Cited

U.S. PATENT DOCUMENTS

| | | | | |
|---|---|---|---|---|
| 3,177,980 A | * | 4/1965 | Porter | 188/300 |
| 3,528,532 A | * | 9/1970 | Moskow | 188/300 |
| 3,938,793 A | * | 2/1976 | Kaptanis et al. | 267/120 |
| 4,078,779 A | * | 3/1978 | Molders | 267/120 |
| 4,790,580 A | * | 12/1988 | Casilio | 292/262 |
| 5,358,225 A | * | 10/1994 | Volpel et al. | 267/64.12 |
| 5,435,529 A | * | 7/1995 | Day et al. | 267/64.12 |
| 6,126,222 A | | 10/2000 | Nguyen et al. | |
| 6,273,405 B2 | * | 8/2001 | Okamoto | 267/64.12 |
| 6,634,627 B1 | * | 10/2003 | Stevenson | 267/64.12 |

* cited by examiner

*Primary Examiner*—Christopher P Schwartz
(74) *Attorney, Agent, or Firm*—Ralph E. Smith

(57) ABSTRACT

A gas compression spring is mounted with an exterior element configured to allow a user to adjust the extension of the spring by rotating or sliding the exterior element. The user can line up an internal mechanism which is configured to limit the extension of the gas spring, and therefore stop the extension of the gas spring at a predetermined height. Additionally, an override mechanism is included where a user requires full extension of the gas spring. For example, the user can override the internal mechanism by applying a force in the direction of the extension, which disengages the mechanism allowing full extension. When the spring is compressed again, the mechanism resets and opens to the predetermined height. The gas spring can be utilized in a vehicle liftgate system, allowing the liftgate to open at one or more heights based upon the internal mechanism settings of the gas spring.

26 Claims, 17 Drawing Sheets

MULTIPLE STOP GAS COMPRESSION SPRING

FIELD OF THE DISCLOSURE

The present disclosure relates generally to gas compression springs and gas struts used in vehicle litigate systems. More specifically, the present disclosure relates to a multiple stop gas compression spring that enables a user to choose one of a plurality of predetermined stops to restrict both the extendibility of the gas compression spring and the rise of the liftgate away from the vehicle.

BACKGROUND OF THE DISCLOSURE

A variety of gas compression spring or gas strut systems and methods have been described previously and are known in the related art. These gas compression springs are often used in vehicle liftgate systems. In a vehicle liftgate system, a gas compression spring is utilized between the vehicle and the liftgate, supplying a force to aid in the opening of the liftgate. The gas compression springs now in use for vehicles, however, do not allow for the user-adjustability of the extension rod in the gas compression spring assembly. Adjustability of the gas compression spring is desired to accommodate users of varying heights in their attempts to reach the liftgate when it is located in an open position and to adjust the extendibility of the liftgate for purposes of clearance in a garage entryway or the like.

BRIEF SUMMARY OF THE DISCLOSURE

In various exemplary embodiments, the present invention provides a gas compression spring mounted with an exterior element configured to allow a user to adjust the extension of the spring by rotating or sliding the exterior element. By rotating or sliding the exterior element, the user lines up an internal mechanism which is configured to limit the extension of the gas compression spring, and therefore stop the extension of the gas compression spring at a predetermined length. Additionally, an override mechanism is included where a user requires full extension of the gas compression spring. For example, the user can override the internal mechanism by applying a force in the direction of the extension, which disengages the mechanism allowing full extension. When the spring is compressed again, the mechanism resets and opens to the predetermined height. In one exemplary application, the gas compression spring can be utilized in a vehicle liftgate system, allowing the liftgate to open at one or more predetermined lengths based upon the internal mechanism settings of the gas compression spring.

Advantageously, the multiple stop gas compression spring overcomes many of the deficiencies known in the art pertaining to gas compression springs used in vehicle liftgate systems. The present disclosure provides an easy-to-use and adjustable gas compression spring such that a vehicle liftgate is opened and then automatically raised to and stopped at varying heights, based on previously set user settings to the gas compression spring. The present disclosure also provides an override feature in which the vehicle liftgate is fully extended despite any earlier setting of the multiple stop indicator. Furthermore, the present disclosure provides a multiple stop gas compression spring that automatically returns the gas compression spring to the user's original setting after a manual override use.

In an exemplary embodiment of the present invention, a multiple stop gas compression spring for use in combination with a vehicle liftgate or the like includes a gas compression strut assembly including a gas chamber configured to provide a repulsive force, and an extension rod slidably disposed at least partially within the gas chamber and configured to receive the repulsive force; a plurality of indicators visible to a user on a lower casing, and each indicator informing a user one of a plurality of predetermined settings indicative of the length to which the extension rod is extended by the repulsive force within the gas chamber, and further indicative of a specific height to which the vehicle liftgate is opened; and a selection handle, the selection handle being grasped by a user and matched to one of the plurality of indicators and visible to the user on the lower casing. The multiple stop gas compression spring is configured to selectively adjust to a desired height to which the vehicle liftgate opens. The gas chamber and the extension rod include a substantially cylindrical shape, and the plurality of indicators and the selection handle are disposed about an indicator sleeve. The multiple stop gas compression spring of further includes a strut override assembly, the strut override assembly providing the user with an ability to override any earlier setting chosen on the indicator sleeve, as identified by one of the plurality of indicators, and thus open the vehicle liftgate to a greater height than that which the multiple stop gas compression spring was originally set. The strut override assembly, after a manual override has occurred by the user, returns the liftgate to its originally indicated position once the liftgate is fully closed, in relation to the vehicle, and is subsequently reopened. The selection handle further includes a selection window, the selection window being disposed about the selection handle and receiving one of the plurality of indicators disposed about the indicator sleeve, and further informing the user on the lower casing of the setting chosen, indicative of the height to which the vehicle liftgate will be raised on the next opening of the vehicle liftgate. The strut override assembly further includes an override sleeve, the override sleeve being substantially cylindrical and being disposed about a lower casing of the multiple stop gas compression spring; a plurality of spring pins; a plurality of pin holes located on the override sleeve and in which the plurality of spring pins are disposed while the multiple stop gas compression spring is at a non-override static position; a plurality of pin retaining springs, the plurality of spring pins and the plurality of pin retaining springs providing the tension between the override sleeve and the lower casing of the multiple stop gas compression spring; and an override attachment collar, the override attachment collar disposed about the extension rod and providing a stop for the override sleeve on the extension rod.

Additionally, the strut override assembly further includes a compression spring, the compression spring being disposed about the strut override assembly, providing tension between an override attachment collar and a spring compressor, wherein the spring compressor is disposed about the strut override assembly and the compression spring, depressing the compression spring of the strut override assembly when in use; and a plurality of pins disposed about on opposite sides from one another of the spring compressor, the plurality of pins connecting the strut override assembly to the main sleeve. Alternatively, the multiple stop gas compression spring further includes an override collar, the override collar being disposed about the main sleeve and being substantially cylindrical; a taper, disposed about the override collar, and about which the plurality of spring pins of the strut override assembly slide during a manual override to the multiple stop gas compression, spring initiated by the user; and a pin trough, disposed about the override collar, and about which the plurality of spring pins rest, when the multiple stop gas compression spring is not being manually overridden. Optionally, the strut override assembly further includes an override collar guide, the override collar guide being disposed about the strut override assembly and the taper and guiding the override collar within the override sleeve; and the override sleeve, further including an override collar guide path, the override collar guide path being disposed within the override sleeve and maintaining the override collar guide during its movement. Also, the multiple stop gas compression spring of can further include a lower threaded end, the lower threaded end being disposed about the outermost end of the override collar and providing a means of attachment to a vehicle mounting bracket, thereby securely attaching the lower end of the multiple stop gas compression spring to a vehicle.

Additionally, the multiple stop gas compression spring can further include a torsional spring, the torsional spring being disposed under the selection handle and providing tension between the selection handle and a stop pin collar of the multiple stop gas compression spring; and a torsional spring retaining cap, the torsional spring retaining cap being disposed under the selection handle and against the torsional spring, depressing the torsional spring. Optionally, the multiple stop gas compression spring can further include at least one stop pin, disposed beneath the selection handle; a stop pin collar, the stop pin collar disposed between the selection handle and the main sleeve; a track, the track being disposed on a main sleeve and providing a receiving area for at least one stop pin; and a dog clutch, the dog clutch disposed on the main sleeve and providing a means to couple the rotating selection handle, the main sleeve, and the stop pin collar.

In another exemplary embodiment of the present invention, a multiple stop gas compression spring includes a gas chamber, the gas chamber being substantially cylindrical and providing a repulsive force; an extension rod, the extension rod being substantially cylindrical and being slidably disposed within the gas chamber and receiving the repulsive force from the gas chamber; a plurality of indicators, the plurality of indicators being disposed about an indicator sleeve and visible to a user on a lower casing on the multiple stop gas compression spring, and each indicator informing a user one of a plurality of predetermined settings indicative of the length to which the extension rod is extended by the repulsive force within the gas chamber, and further indicative of a specific height to which the vehicle liftgate is opened; a selection handle, the selection handle being grasped by the user and matched to one of the plurality of indicators disposed about the indicator sleeve and visible to a user on the lower casing; and a strut override assembly, the strut override assembly providing the user with an ability to override any earlier setting chosen on the indicator sleeve, as identified by one of the plurality of indicators, and thus open the vehicle liftgate to a greater height than that which the multiple stop gas compression spring was originally set.

In yet another exemplary embodiment of the present invention, a user-adjustable multiple stop gas compression spring includes a pin disposed on an inner sleeve, a middle sleeve including one or more notches configured to receive the pin, wherein the inner sleeve is disposed within the middle sleeve, an upper casing including a torsional spring configured to align the pin to one of the one or more notches responsive to a force provided by a user, and an extension rod, the extension rod being substantially cylindrical and being slidably disposed within the middle sleeve and the upper casing. The middle sleeve and the extension rod are configured to extend away from the upper casing responsive to a gas compression force, and the length of extension of the extension rod is determined responsive to the alignment of the pin to one of the one or more notches. The user-adjustable multiple stop gas compression spring further includes a pin sleeve connected to the extension rod and the inner sleeve including a plurality of pin retaining springs and a plurality of spring pins. The plurality of pin retaining springs and the plurality of spring pins provide tension between the pin sleeve and the middle sleeve, and a user can extend the multiple-stop gas compression spring to an override position through an applied force on the compression spring which utilizes the plurality of pin retaining springs and the plurality of spring pins to extend the middle sleeve and the extension rod on the inner sleeve.

BRIEF DESCRIPTION OF THE DRAWINGS

The present disclosure is illustrated and described herein with reference to the various drawings, in which like reference numbers denote like system components, respectively, and in which.

DETAILED DESCRIPTION OF THE DISCLOSURE

In various exemplary embodiments, the present invention provides a gas compression spring mounted with an exterior element configured to allow a user to adjust the extension of the spring by rotating or sliding the exterior element. By rotating or sliding the exterior element, the user lines up an internal mechanism which is configured to limit the extension of the gas compression spring, and therefore stop the extension of the gas compression spring at a predetermined length. Additionally, an override mechanism is included where a user requires full extension of the gas compression spring. For example, the user can override the internal mechanism by applying a force in the direction of the extension, which disengages the mechanism allowing full extension. When the spring is compressed again, the mechanism resets and opens to the predetermined height. In one exemplary application, the gas compression spring can be utilized in a vehicle liftgate system, allowing the liftgate to open at one or more predetermined lengths based upon the internal mechanism settings of the gas compression spring.

Figure 1:
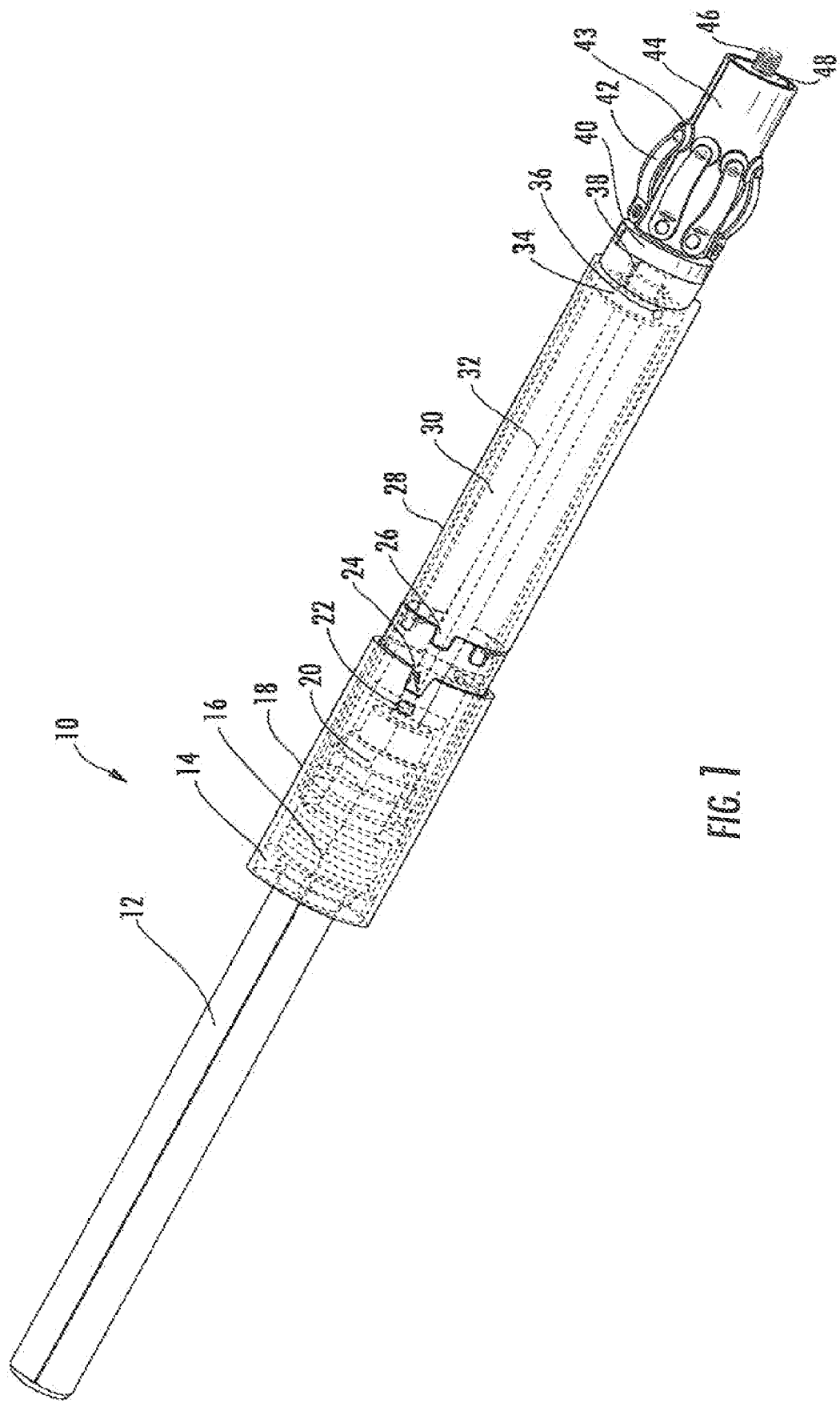
FIG. 1 is a front perspective view of a multiple stop gas compression spring according to an exemplary embodiment of the present invention, shown without the lower casing and illustrating, in particular, the location and the interoperability of the various components of the multiple stop gas compression spring.

Referring now to FIG. 1, a multiple stop gas compression spring 10 is shown, according to an exemplary embodiment of the present invention. The multiple stop gas compression spring 10 includes a substantially cylindrical gas chamber 12 which provides a repulsive force pressure to aid in opening a vehicle liftgate, for example. A torsional spring retaining cap 14 and torsional spring 16 are disposed within a selection handle 18, and the cap 14 and spring 16 are configured to providing spring tension. Disposed about the gas chamber 12 portion of the multiple stop gas compression spring 10 is a stop collar 20. The stop collar 20 is substantially cylindrical and is hollow, like a ring, and includes a stop pin 22 located in the selection handle 18. The stop collar 20 is configured to limit the extension of the multiple stop gas compression spring 10 based on the position of the stop pin 22 disposed on the selection handle 18. The selection handle 18 includes a selection window 24 which includes an indicator 26.

The multiple stop gas compression spring 10 also includes a lower casing 28 and an indicator sleeve 30, both of which are substantially cylindrical in shape and are rotatably disposed about one another. The indicator sleeve 30 includes the indicator 26 to identify a setting on which the multiple stop gas compression spring 10 is set. For example, the settings can include a desired liftgate position. Once a selection setting has been made by the user, the indicator 26, which is a notch-shaped component disposed about the indicator sleeve 30, rests within the selection window 24 of the selection handle 18. The selection window 24 is a notch-shaped receiving area disposed within the selection handle 18. Those of ordinary skill in the art will recognize that the multiple stop gas compression spring 10 could utilize other indicator embodiments or methods as are known in the art.

A user, for example, can set the settings of the multiple stop gas compression spring 10 by rotating the selection handle 18. The rotation of the selection handle 18 in turn rotates the stop pin 22. The stop pin 22, located in the selection handle 18, is configured to engage a stop pin collar 23 (illustrated in FIG. 9). Accordingly, rotation of the selection handle 18 corresponds to movement of the stop pin 22 to engage the stop pin collar 23 based on the desired setting of the gas compression spring 10, i.e. the stop pin collar 23 correspond to different settings. The stop collar 20 is configured to remain stationary during the rotation. The stop pin 22 and the stop pin collar 23 work with the stop collar 20 to determine the extension length of the multiple gas compression spring 10.

The torsional spring 16 and the torsional spring retaining cap 14, disposed beneath the selection handle 18, are configured to provide spring tension to an extension rod 32. The extension rod 32 is the substantially cylindrical and slidably disposed within the gas chamber 12. Accordingly, the tension moves, the extension rod 32 and thus opens a vehicle litigate, for example. Advantageously, the present invention enables the user to select one or more settings, which in turn determine the extension length of the extension rod 32. Collectively, the gas chamber 12 and the extension rod 32 are a gas compression strut assembly.

A spring compressor 34 is located at an opposite end of the indicator sleeve 30 from the selection handle 18. The spring compressor 34 includes a pair of pins 36, one on each side, which fit into a pin hole 60 (illustrated in FIG. 9) located in the indicator sleeve 30. A compression spring 38 is located between the indicator sleeve 30 and an override attachment collar 40. The multiple stop gas compression spring 10 can include a plurality of pin retaining springs 42, a plurality of spring pins 43, and an override sleeve 44. The override sleeve 44 is substantially cylindrical and disposed about the lower casing 28. The plurality of spring pins 43 and the plurality of pin retaining springs 42 provide tension between the override sleeve 44 and the lower casing 28.

The override attachment collar 40 is substantially cylindrical and is configured to provide a stop for the override sleeve 44 on the extension rod 32, the compression spring 38, and the spring compressor 34. Collectively, the components 34, 36, 38, 40, 42, 43, and 44 form a strut override assembly 70 (illustrated, in FIGS. 6 and 7). The strut override assembly 70 is configured to enable the user to extend the multiple gas compression spring 10 beyond the selected setting. Additionally, the gas compression spring 10 includes a lower threaded end 46 on an override collar 48. The override collar 48 is located on one end of the override sleeve 44. For example, the lower threaded end 46 can connect to a bracket located on a vehicle.

Figure 2:
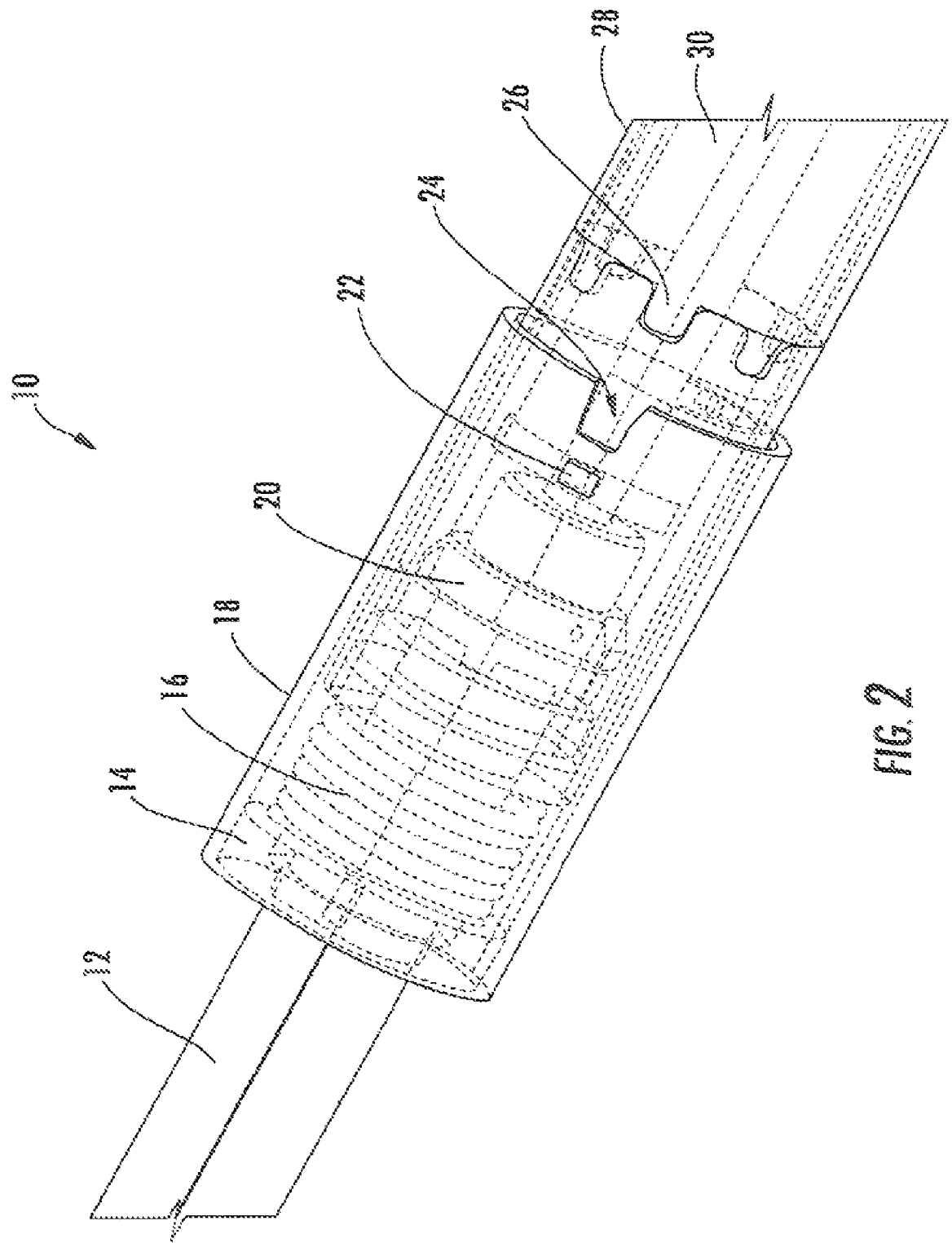
FIG. 2 is a front perspective view of the multiple stop gas compression spring of FIG. 1, shown close up to further illustrate the locations and interoperability of the indicator sleeve, selection handle, and selection window.

Referring now to FIG. 2, the multiple stop gas compression spring 10 of FIG. 1 is shown, in a close up view, illustrating the interoperability of the indicator 26 and selection window 24. The indicator 26 is a notch-shaped component disposed about the indicator sleeve 30 that, once in place as set by a user, rests within the selection window 24 of the selection handle 18. The selection window 24 is a notch-shaped receiving area disposed within the selection handle 18 that receives the indicator 26.

Figure 4:
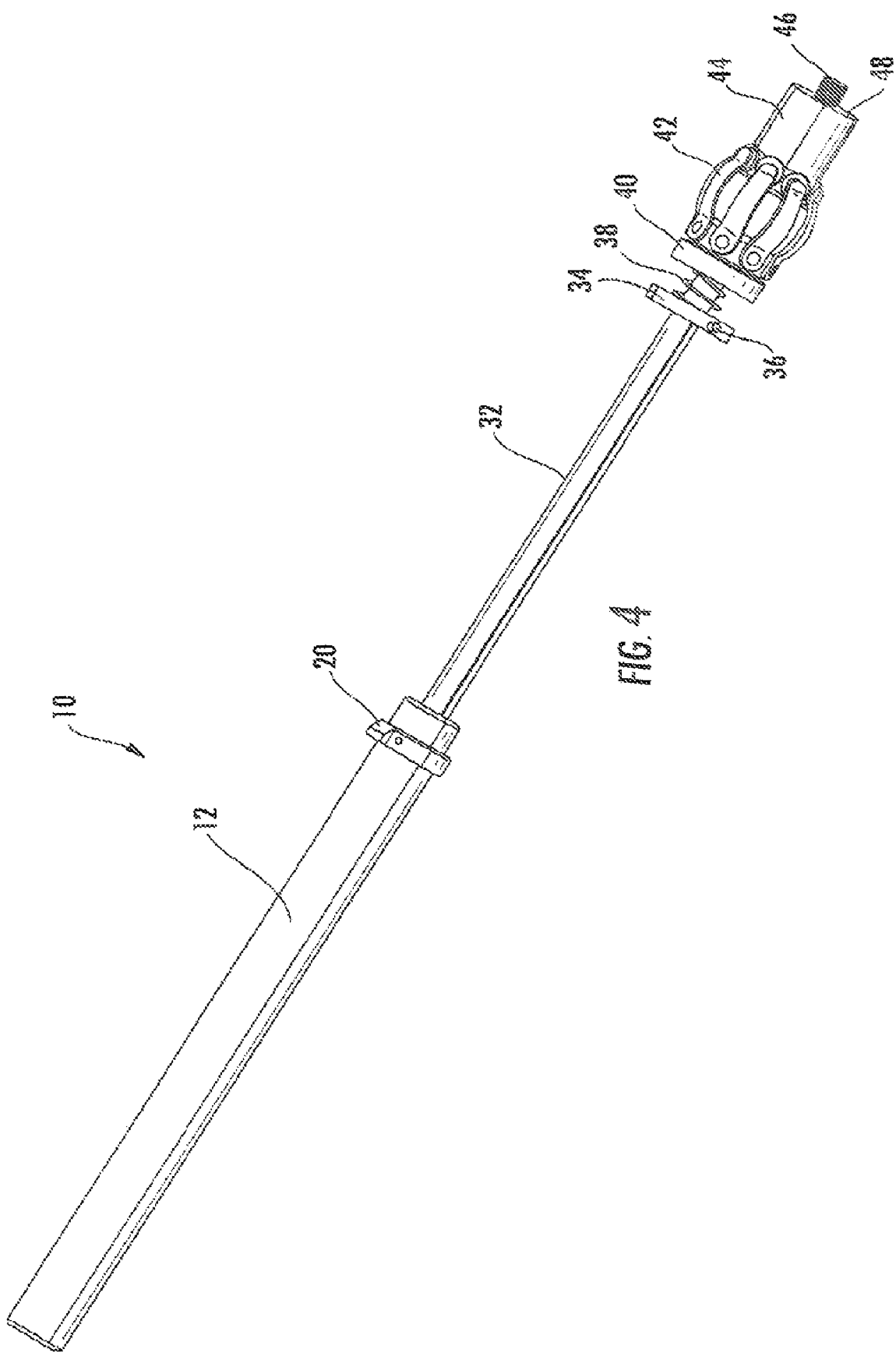
FIG. 4 is a front perspective view of the multiple stop gas compression spring of FIG. 1, illustrating, in particular, the strut assembly, extension rod, gas chamber, stop collar, compression spring, and retaining spring assembly.

The gas chamber 12, also shown in FIG. 2, is configured to provide pressure to move the extension rod (as shown in FIGS. 1 and 4) and thus open a vehicle liftgate, for example. The stop collar 20 is located on the gas chamber 12 portion of the multiple stop gas compression spring 10. The stop collar 20 is substantially cylindrical and is hollow, like a ring. The stop pin 22 is located in the selection handle 18 and disposed on the stop collar 20. Collectively, the stop collar 20, stop pin 22, and stop pin collar 23 are configured to limit the extension range of the torsional spring 16 and torsional spring retaining cap 14. The stop pin 22 engages the stop pin collar 23 based on the selected setting. The torsional spring 16 and torsional spring retaining cap 14 are disposed beneath the selection handle 18, and collectively are configured to provide spring tension to the extension rod 32.

The indicator sleeve 30, located on the lower casing 28, includes the indicator 26. The indicator 26 is operative to identify on which setting the multiple stop gas compression spring 10 is set. In one exemplary embodiment, the user rotates the selection handle 18 to turn the stop pin 22 to a selection setting. The indicator 26, once the selection setting has been made by the user, rests within a selection window 24 of the selection handle 18.

Figure 3:
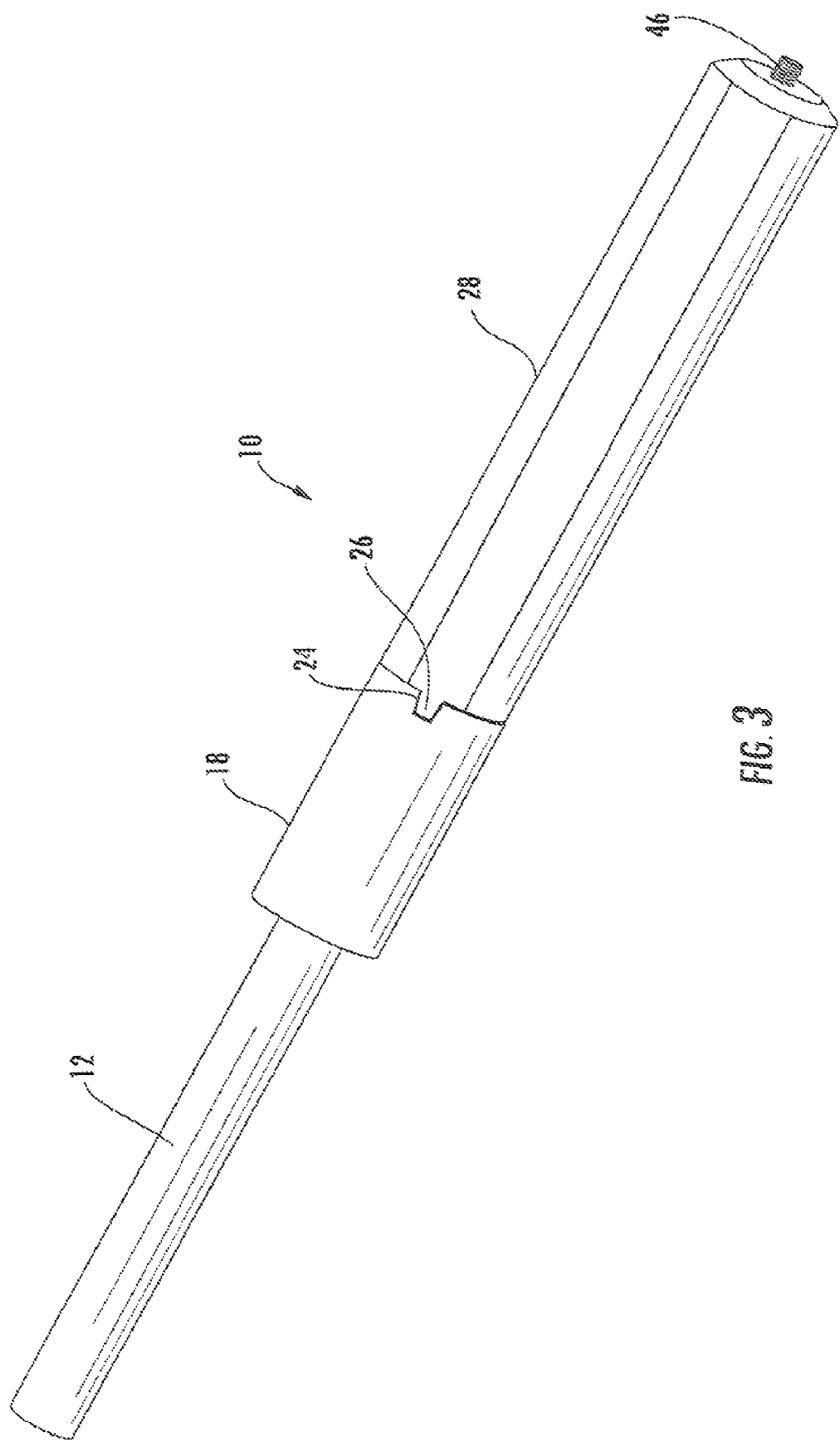
FIG. 3 is a front perspective view of the multiple stop gas compression spring of FIG. 1, shown with the lower casing attached, to the selection handle, selection window, and indicator.

Referring now to FIG. 3, the multiple stop gas compression spring 10 is shown as a user would observe it. The multiple stop gas compression spring 10 includes the lower casing 28, the selection handle 18, and the extension rod 32. The selection handle 18 includes the plurality of selection windows 24, which indicate to the user the setting of the desired liftgate position, such as 1, 2, or 3, or high, medium, and low, for example. The indicator 26 is located in one of the plurality of selection windows 24 indicating the current setting for the multiple stop gas compression spring 10. Also shown is the lower threaded end 46, which attaches to a bracket and ultimately the vehicle body. In an exemplary operation of the present invention, a user the selection handle 18 of the multiple stop gas compression spring 10 grasps and rotates it to a position, as indicated by indicator 26 and selection window 24, representing the desired location of the vehicle liftgate upon opening the next time.

Referring now to FIG. 4, the multiple stop gas compression spring 10 is shown in an extended position and without the lower casing 28 and selection handle 18 of FIG. 3. The multiple stop gas compression spring 10 includes the gas chamber 12 which provides pressure to move the extension rod 32 and thus open a vehicle liftgate. The stop collar 20 is located on the gas chamber 12 portion of the multiple stop gas compression spring 10. The plurality of pin retaining springs 42, plurality of spring pins 43, and override sleeve 44 are located at an opposite end of the multiple stop gas compression spring 10 relative to the gas chamber 12. The plurality of pin retaining springs 42 and plurality of spring pins 43 are configured to provide tension between the override sleeve 44 and the lower casing (not shown). The override attachment collar 40 is also shown, which provides a stop for the override sleeve 44 on the extension rod 32, the compression spring 38, and the spring compressor 34. The spring compressor 34 includes the pair of pins 36, one on each side, which fit into pin hole 60 located in the indicator sleeve (not shown). Also shown is the lower threaded end 46, which attaches to a bracket and ultimately the vehicle body, and the override collar 48.

Figure 5:
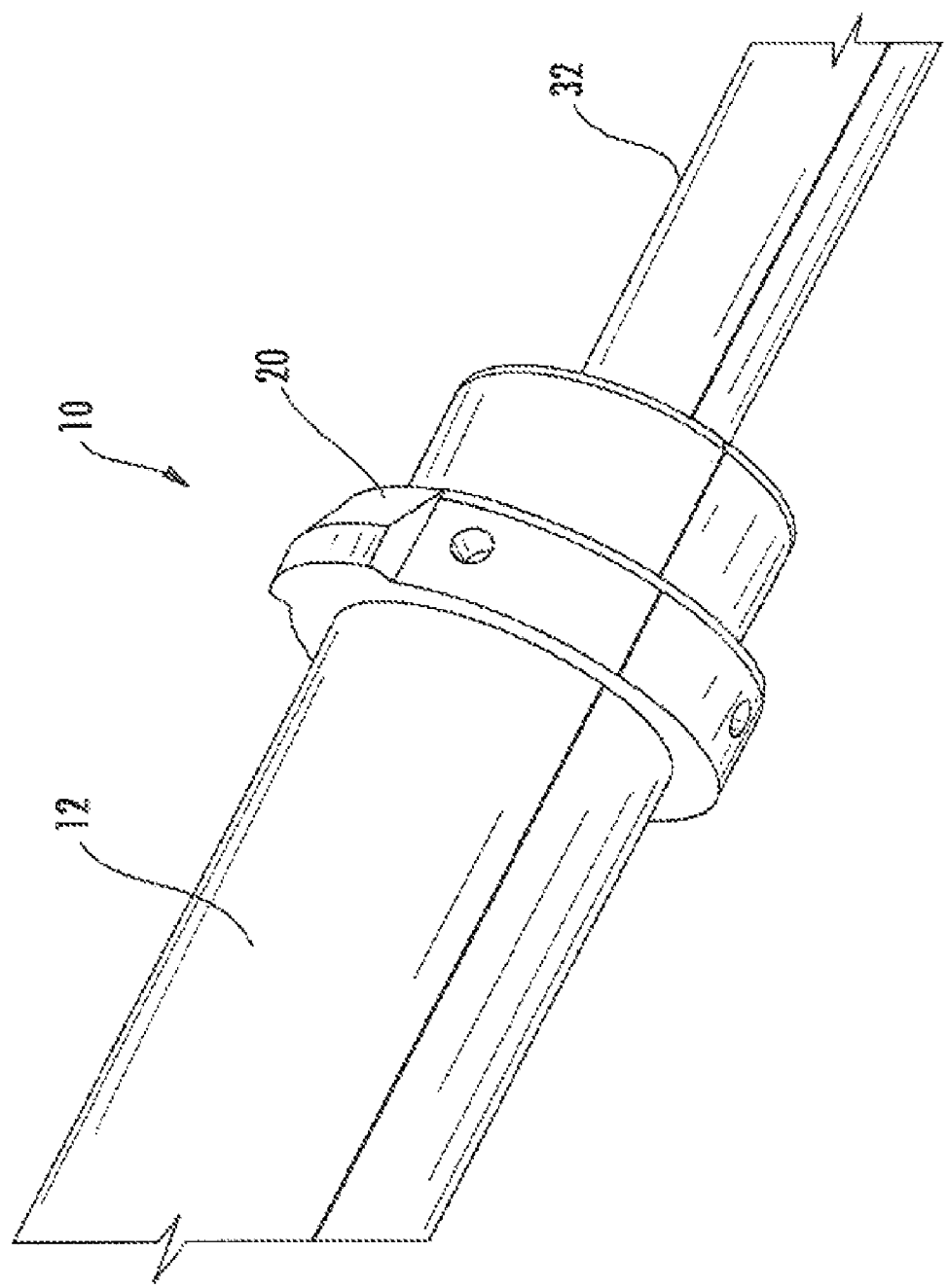
FIG. 5 is a front perspective view of the multiple stop gas compression spring of FIG. 1, illustrating, in particular, the stop collar attached to the gas chamber and the extension rod.

Referring now to FIG. 5, the multiple stop gas compression spring 10 is shown highlighting the placement of the stop collar 20. The stop collar 20 is disposed on the substantially cylindrical gas chamber 12. The stop collar 20 is substantially cylindrical and is hollow, like a ring. The stop collar 20 is stationary while the selection handle 18 is rotated to select a setting. The rotation of the selection handle 18 engages the stop pin 22 into the stop pin collar 23. In an exemplary embodiment of the present invention, the stop collar 20 provides the internal mechanism which is configured to limit the extension of the multiple gas compression spring 10. The extension rod 32 is also shown, disposed about the gas chamber 12. Pressure within the gas chamber 12 provides a repulsive force that is used to move and extend the extension rod 32, and thus open a vehicle liftgate, for example.

Figure 6:
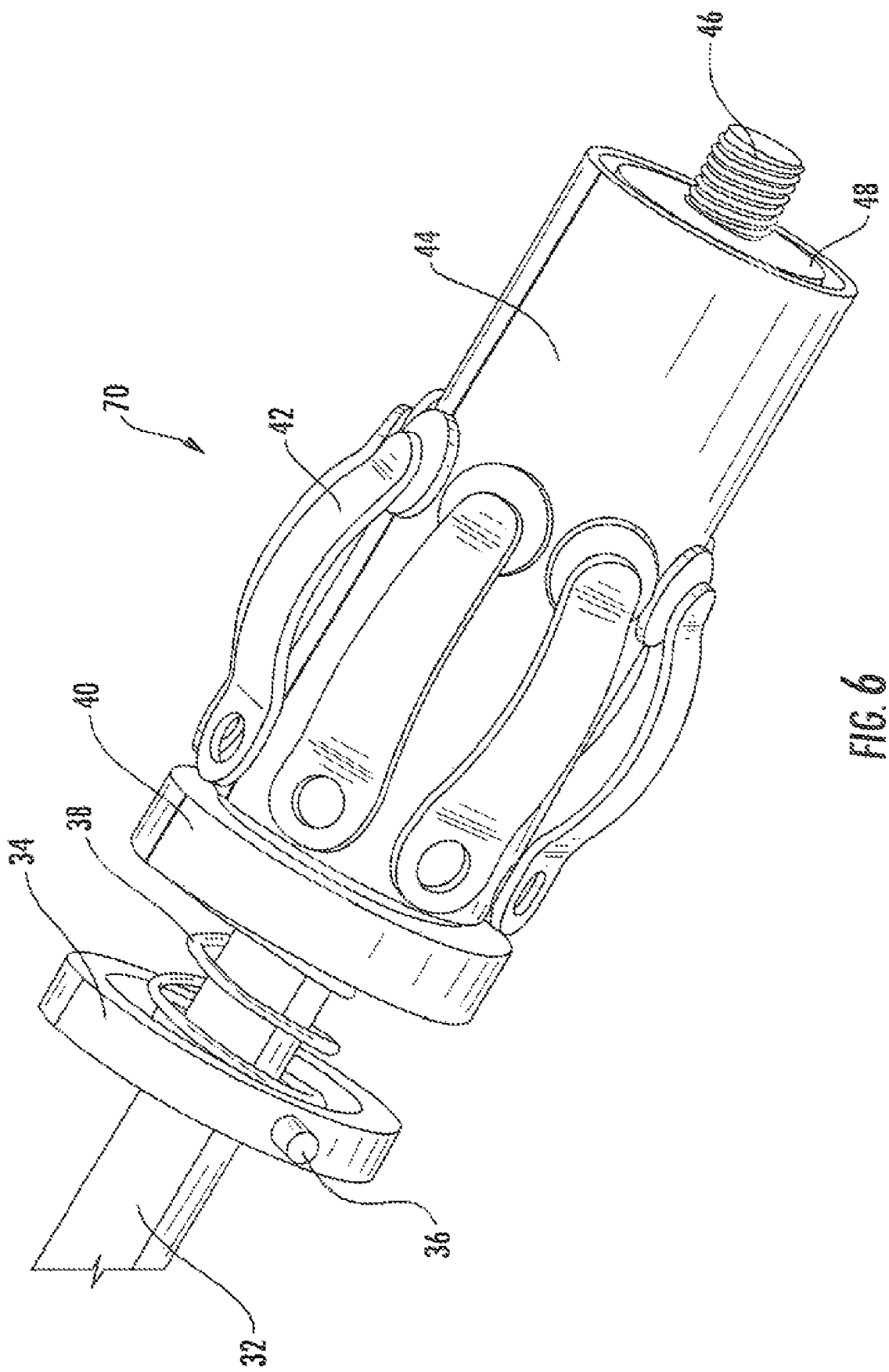
FIG. 6 is a front perspective view of the multiple stop gas compression spring of FIG. 1, illustrating, in particular, the strut override assembly, override attachment collar, compression spring, and spring compressor.

Referring now to FIG. 6, the strut override assembly 70 is shown in an exemplary embodiment of the present invention. The strut override assembly 70 provides an override capability to a user for opening the vehicle liftgate to a position other than that prescribed by the indicator 26 and selection window 24. The strut override assembly 70 is shown with the override sleeve 44, the plurality of spring pins 43, and the plurality of pin retaining springs 42. The plurality of spring pins 43 and the plurality of pin retaining springs 42 provide the tension between the override sleeve 44 and the lower casing (not shown).

The strut override assembly 70 is also includes the override attachment collar 40, which provides a stop for the override sleeve 44 on the extension rod 32. The strut override assembly 70 is also shown with the compression spring 38 and the spring compressor 34. The spring compressor 34 has a pair of pins 36, one on each side, which fit into pin hole 60 located in the indicator sleeve (not shown). The strut override assembly 70 is attached to and moves about the extension rod 32. Also shown is the lower threaded end 46, which attaches to a bracket and ultimately the vehicle body, and the override collar 48 (which is better viewed and described in FIG. 8).

In an exemplary embodiment of the present invention, the strut override assembly 70 is a disengagement mechanism in which the user can override the internal mechanism for limiting the spring 10 extension by applying a force in the direction of the extension, which disengages the internal mechanism allowing full extension. When the spring 10 is compressed again, the internal mechanism resets and opens to the predetermined height as prescribed by the indicator 26.

Figure 7:
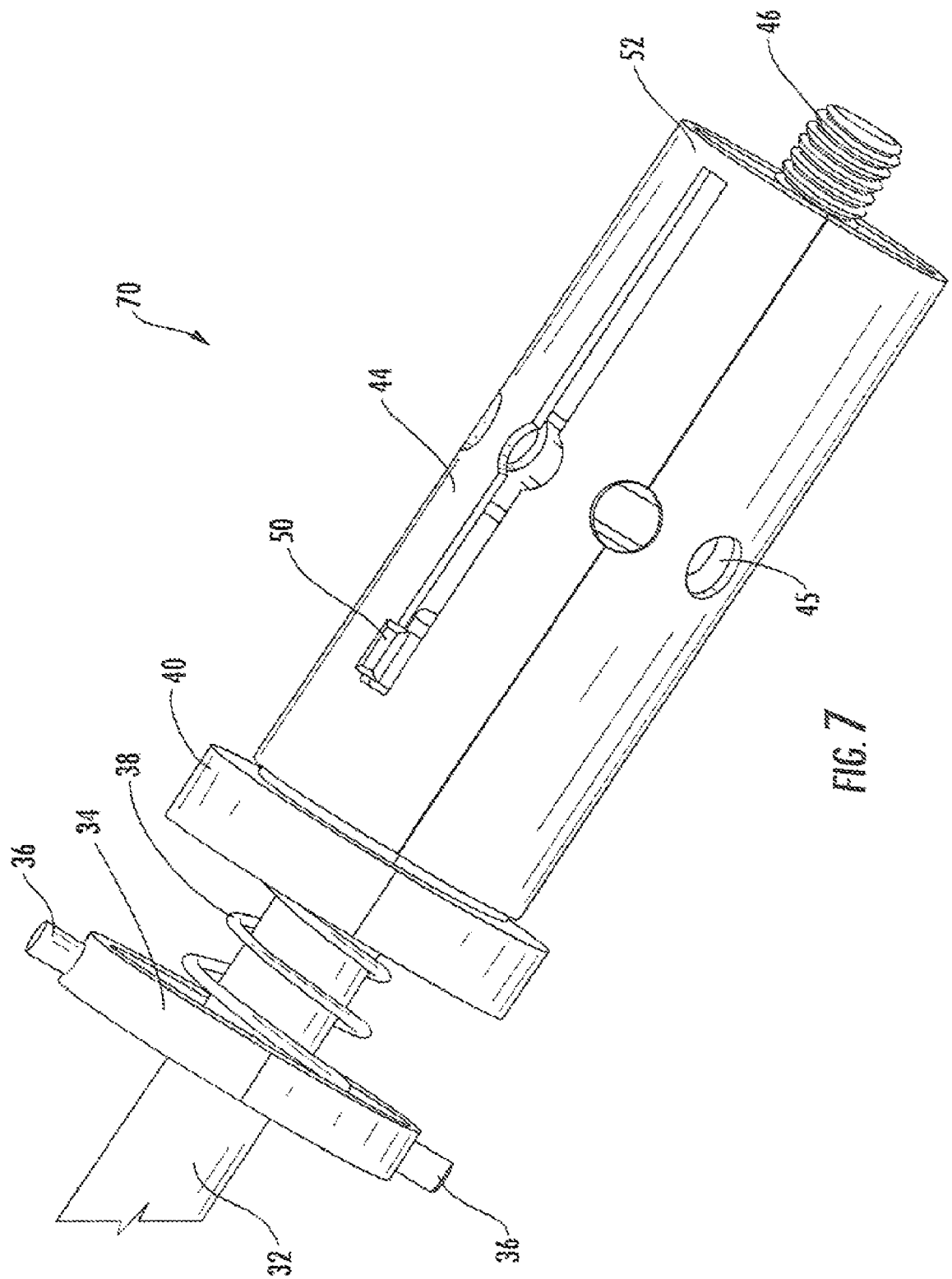
FIG. 7 is a front perspective view of the multiple stop gas compression spring of FIG. 1, illustrating, in particular, the strut override assembly shown without the pins and the pin retaining springs.
Figure 8:
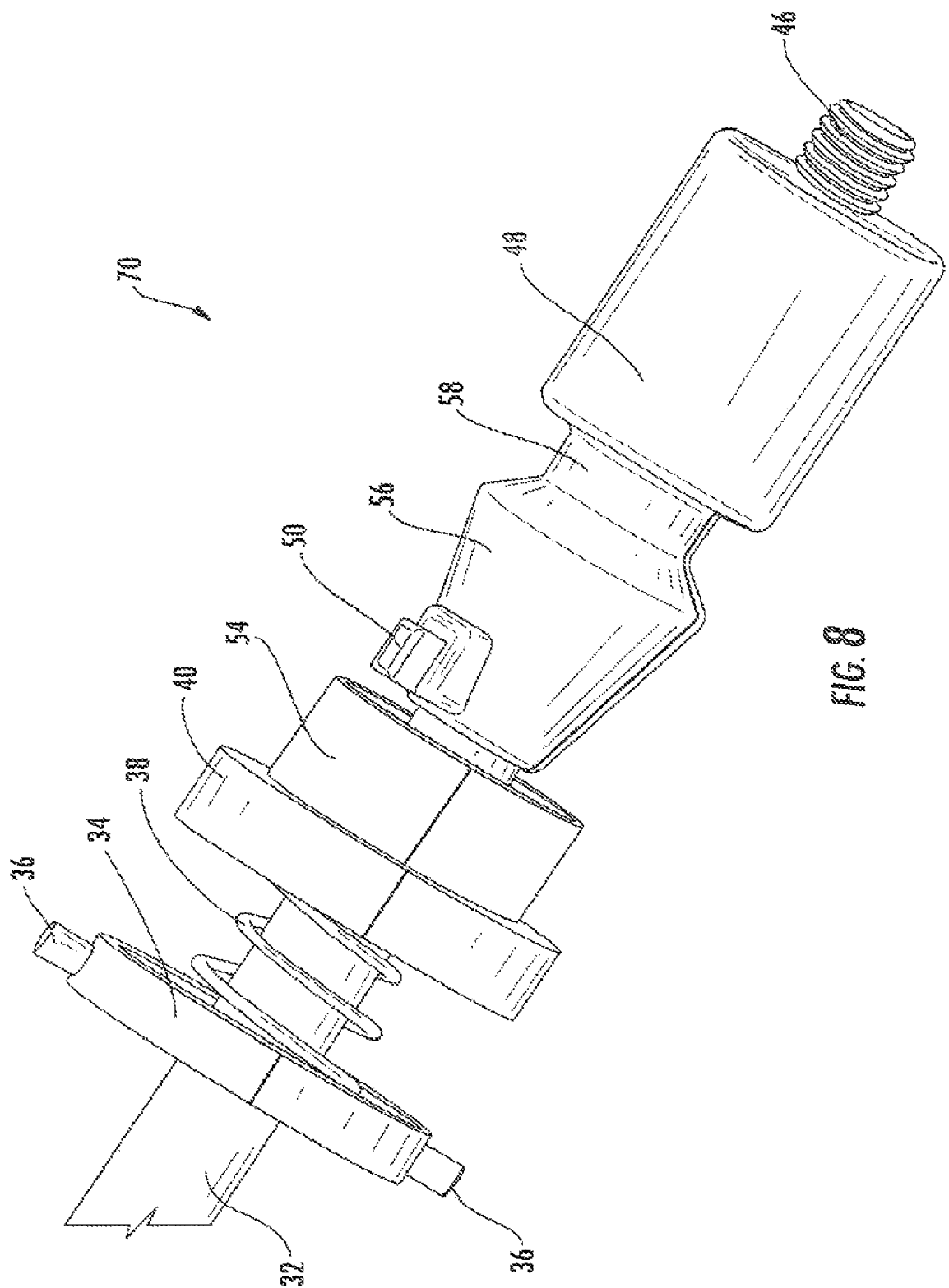
FIG. 8 is a front perspective view of the multiple stop gas compression spring and the strut override assembly of FIG. 7, shown with the override sleeve removed, and illustrating, in particular, the inner override attachment collar, override collar, pins resting position trough, taper, and lower threaded end.

Referring now to FIG. 7, the strut override assembly 70 is shown with the plurality of spring pins 43 and the plurality of pin retaining springs 42 (as shown in FIG. 6) removed. The strut override assembly 70 is shown with the override sleeve 44 and a plurality of pin holes 45 for the plurality of spring pins 43 (of FIG. 6). The override sleeve 44 includes an override collar guide path 52 for an override collar guide 50. The override collar guide path 52 and guide 50 are located beneath the override sleeve 44 and is illustrated in FIG. 8. The strut override assembly 70 is also shown with the override attachment collar 40, which provides a stop for the override sleeve 44 on the extension rod 32.

The strut override assembly 70 is also shown with the compression spring 38 and the spring compressor 34. The spring compressor 34 has a pair of pins 36, one on each side, which fit into pin hole 36 located in the indicator sleeve (not shown). The strut override assembly 70 is attached to and moves about the extension rod 32. Also shown is the lower threaded end 46, which attaches to a bracket and ultimately the vehicle body.

The strut override assembly 70 provides a user with the ability to override any earlier setting in the indicator 26 of the multiple stop gas compression spring 10 (not shown). The user simply pushes on the liftgate in an upward direction and the strut override assembly 70 adjusts accordingly to further open the vehicle liftgate. Once the liftgate is closed, and subsequently reopened, the liftgate will return to the preset location as noted in the indicator 26.

Referring now to FIG. 8, the strut override assembly 70 is shown with the plurality of spring pins 43 and the plurality of pin retaining springs 42 of FIG. 6 removed and with the override sleeve 44 of FIG. 7 removed. The strut override assembly 70 is shown with the override collar 48. A portion of the override collar 48 provides a tapered portion 56 and a trough 58 for the resting position location of the spring pins 43. While in use, the spring pins 43, which are attached to the pin retaining springs 42, slide over the tapered portion 56 while being moved about the extension rod 32. The override assembly 70 rests in place when the spring pins 43 are located in the trough 58 for die resting position location of the spring pins 43.

When a user desires to manually override the location of the liftgate, such as to open the liftgate to a higher location from the original user indicator setting, the multiple stop gas compression spring 10 is extended, and the spring pins 43 are moved out of the trough 58 and over the taper 56. The override collar guide 50 which moves about the override collar guide path 52 (as shown in FIG. 7) is shown in relation to the taper 56 and trough 58 of the override collar 48. The strut override assembly 70 is also shown with a substantially cylindrical override attachment collar 40, and a substantially cylindrical, yet smaller in diameter, inner override attachment collar 54, which provide a stop for the override sleeve 44 on the extension rod 32. The override attachment collar 40 and the inner override attachment collar 54 may be integrally formed. The override sleeve 44 (shown in FIG. 7) rests on the inner override attachment collar 54 and against the override attachment collar 40.

The strut override assembly 70 is also shown with a compression spring 38 and a spring compressor 34. The spring compressor 34 has a pair of pins 36, one on each side, which fit into pin hole 60 located in the indicator sleeve (not shown). The strut override assembly 70 is attached to and moves about the extension rod 32. Also shown is the lower threaded end 46, which attaches to a bracket and ultimately the vehicle body.

Figure 9:
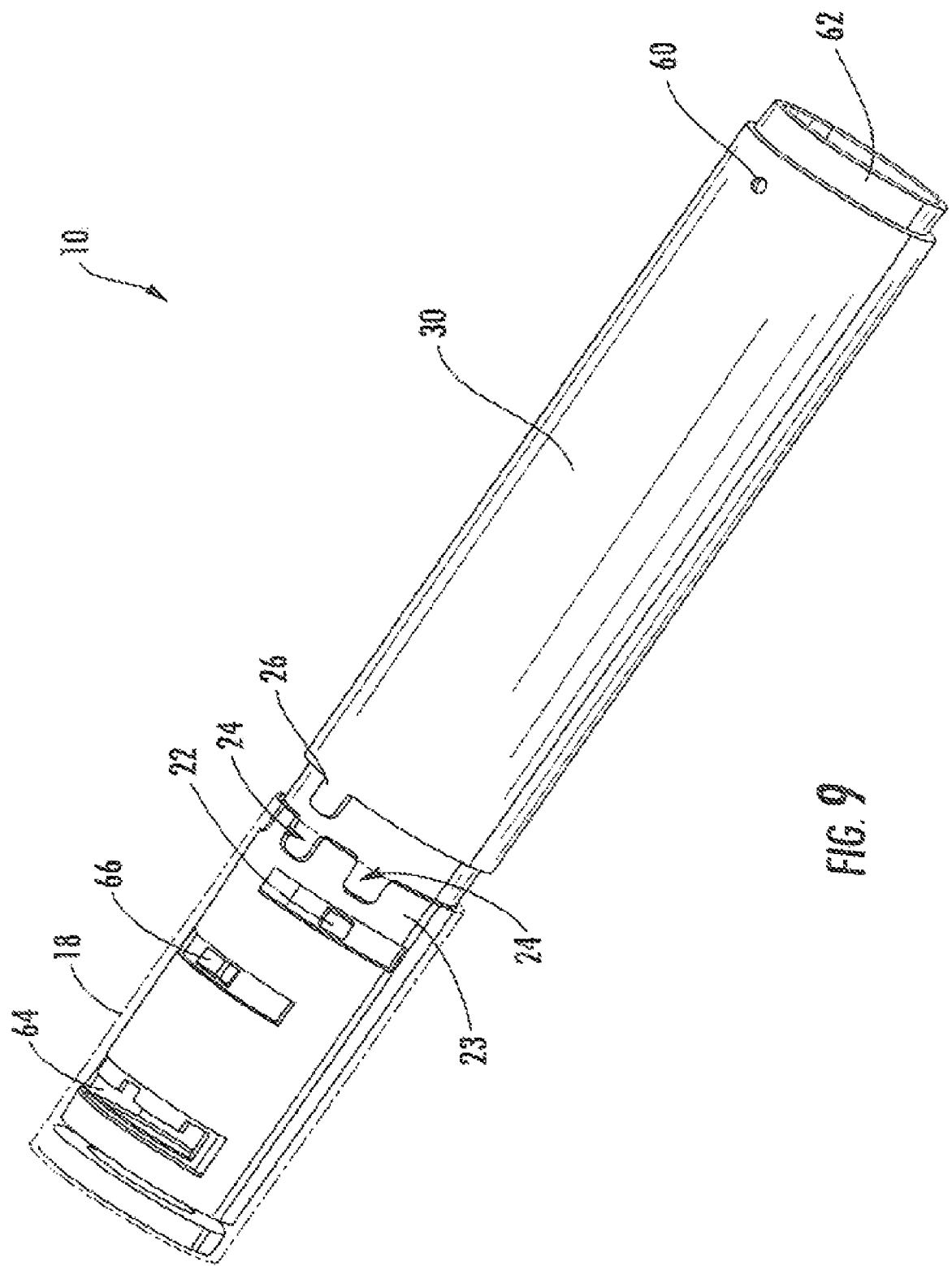
FIG. 9 is a front perspective view of the multiple stop gas compression spring of FIG. 1, illustrating the interoperability of the indicator sleeve, pin hole, main sleeve, selection window, indicator, stop pin collar, dog clutch, and the first and second stop pins.

Referring now to FIG. 9, the multiple stop gas compression spring 10 is shown with the selection handle 18 removed (shown here with dashed lines). This portion of the multiple stop gas compression spring 10 includes the substantially cylindrical indicator sleeve 30, which is movable about a main sleeve 62. The indicator sleeve 30 includes the pin hole 60, for use with one of the pins 36 (as shown in FIGS. 6, 7, and 8, for example). The indicator sleeve 30 also includes the indicator 26. The indicator 26 identifies, for the user of the vehicle liftgate, which stop location in which multiple stop gas compression spring 10 is located, thus informing the user to what height the liftgate will be raised.

This portion of the multiple stop gas compression spring 10 also includes the stop pin collar 23. The stop pin collar 23 is substantially cylindrical in shape and is disposed about the selection handle 18. The stop pin collar 23 includes a plurality of selection windows 24 in which the indicator 26 on the indicator sleeve 30 will rest upon a user's determination of which stop, and resultant liftgate height, is desired. The stop pin collar 23 includes tracks for a stop pin 66 and the stop pin 22. The stop pin collar 23 is configured to keep the stop collar 20 in place based on the stop pins 22 and 66. The stop pin collar 23 also includes a dog clutch 64. The dog clutch 64 is disposed within the selection handle 18 and is used to provide a means to couple two rotating shafts.

Figure 10:
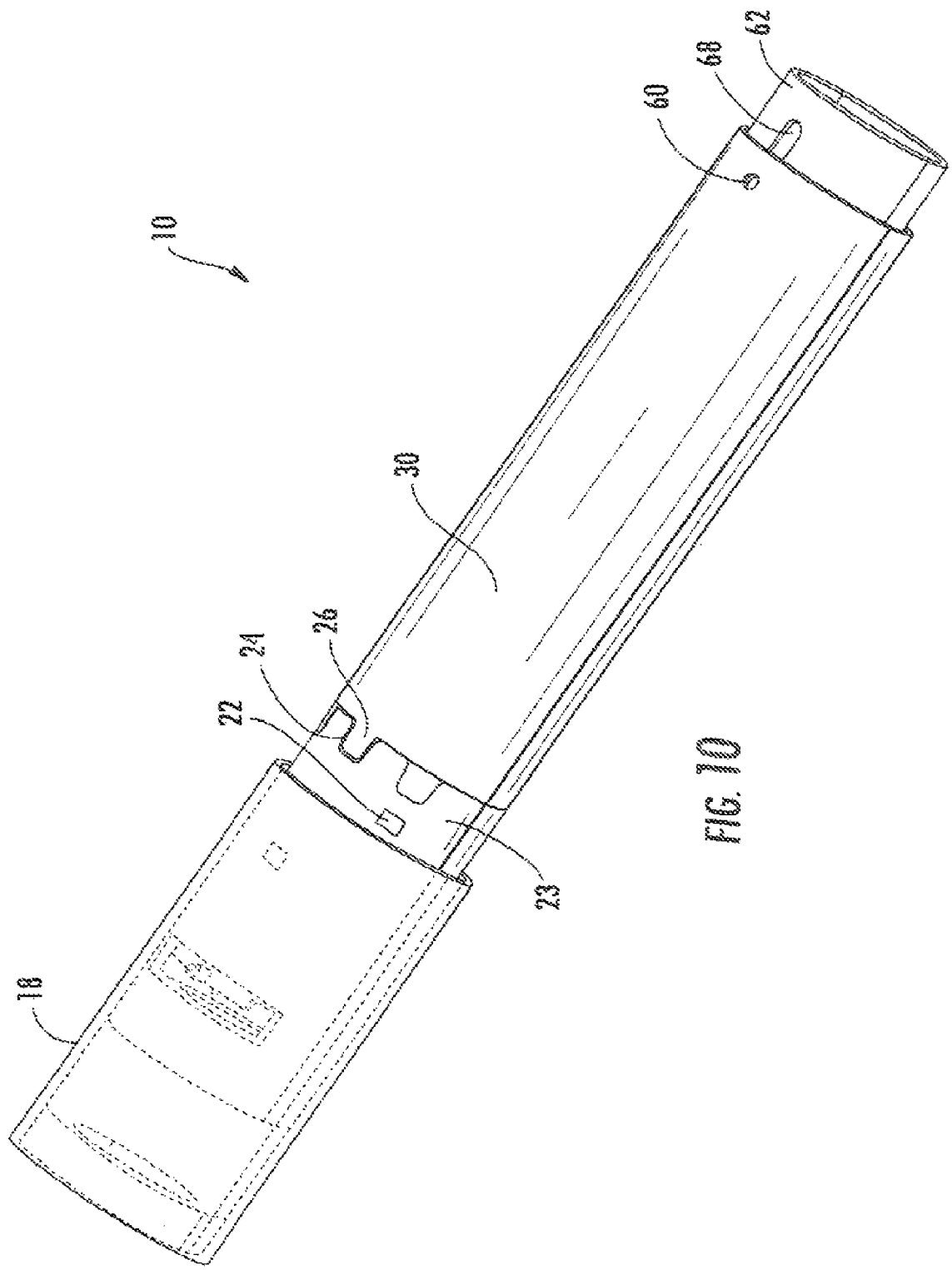
FIG. 10 is a front perspective view of the multiple stop gas compression spring of FIG. 1 illustrating, in particular, the interoperability of the indicator sleeve, pin hole, main sleeve, selection window, indicator, selection handle, stop pin collar, slide area for a pin, dog clutch, and the first and second stop pins.

Referring now to FIG. 10, the multiple stop gas compression spring 10 is shown with the selection handle 18. This portion of the multiple stop gas compression spring 10 includes the indicator sleeve 30, which is movable about the main sleeve 62. The indicator sleeve 30 includes the pin hole 60, for use with the pin 36 (as shown in FIGS. 6, 7, and 8, for example). The main sleeve 62 includes a slide area 68 for the pin 36. The indicator sleeve 30 also includes the indicator 26. The indicator 26 identifies, for the user of the vehicle liftgate, which stop location in which multiple stop gas compression spring 10 is located, thus informing the user to what height the liftgate will be raised.

This portion of the multiple stop gas compression spring 10 also includes the stop pin collar 23. The stop pin collar 23 includes a plurality of selection windows 24 in which the indicator 26 on the indicator sleeve 30 will rest upon a user's determination of which stop, and resultant liftgate height, is desired. The stop pin collar 23 is shown with the first stop pin 22.

Figure 11:
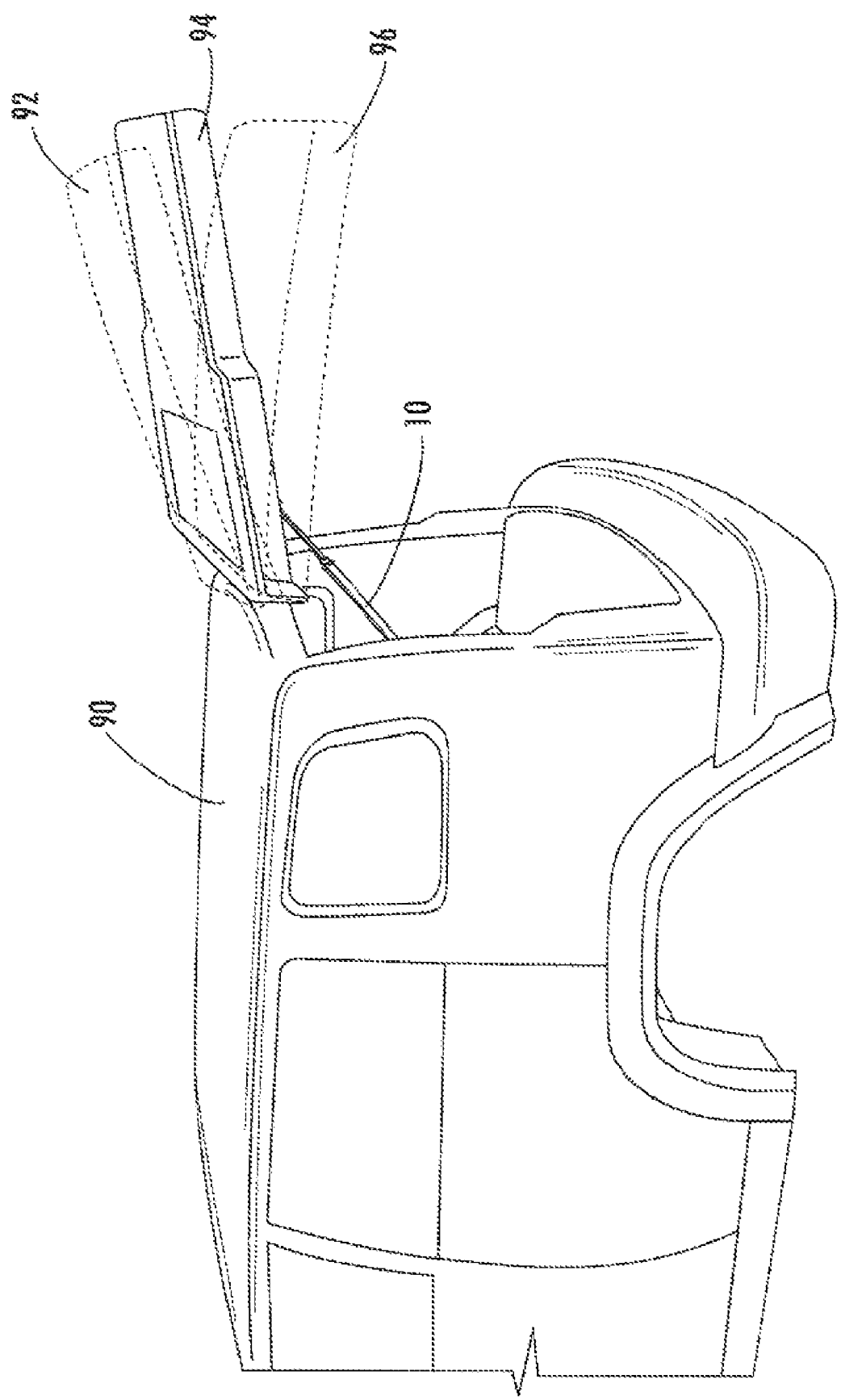
FIG. 11 is a front perspective view of a multiple stop gas compression spring shown in use in a vehicle with a liftgate, illustrating, in particular, three various stops at which the multiple stop gas compression spring may be set, setting the extendibility of the extension rod, and the resultant three liftgate positions achieved as a result of such a setting to the multiple stop gas compression spring.

Referring now to FIG. 11, fee multiple stop gas compression spring 10 is shown in use in a vehicle 90 with a liftgate 92, 94, 96 (shown in multiple positions). There are, for example, three various stops at which the multiple stop gas compression spring 10 is selectively set. Dependent upon the stop position to which the multiple stop gas compression spring 10 is selectively set, the litigate opens to that particular position 92, 94, 96. As shown, when the multiple stop gas compression spring 10 is selectively set to its most extended position, the liftgate is opened to its highest point 92. When multiple stop gas compression spring 10 is selectively set to its least extended position, the liftgate is opened to its lowest point 96. When multiple stop gas compression spring 10 is selectively set to an intermediate position, the liftgate is opened to an intermediate position at point 94.

With this described adjustability, the multiple stop gas compression spring 10 overcomes deficiencies known in the art pertaining to gas compression springs used in vehicle liftgate systems. The multiple stop gas compression spring 10 is easy-to-use. As a user adjusts the multiple stop gas compression spring 10 and selects a desired stop, the vehicle liftgate 92, 94, 96, upon opening, is raised to and stopped at varying heights 92, 94, 96, based on the previously set user settings. The multiple stop gas compression spring 10 provides an override feature in which the vehicle liftgate (previously set to achieve position 94 or 96, for example) is fully extended (to position 92) despite any earlier setting in the multiple stop indicator 26. The multiple stop gas compression spring 10 also provides that the multiple stop gas compression spring 10 is automatically returned to the user's original setting after a manual override use.

Figure 12:
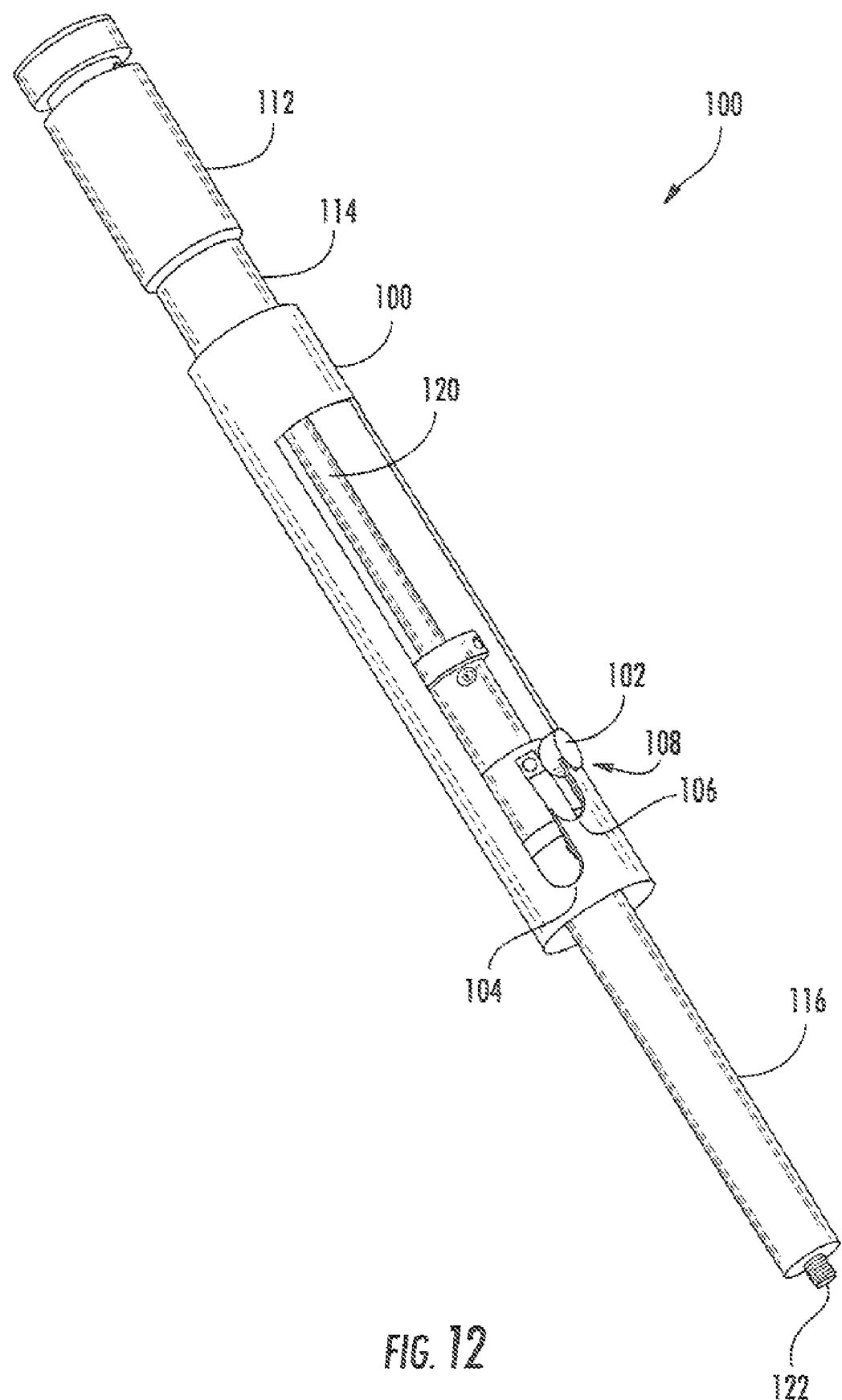
FIG. 12 is a front perspective view of another exemplary embodiment of a multiple stop gas compression spring, illustrating a pin configured to engage one or more notches on a middle sleeve.

Referring now to FIG. 12, in another exemplary embodiment of the present disclosure, a multiple stop gas compression spring 100 includes a pin 102 which is configured to engage one or more notches 104, 106, and 108 on a middle sleeve 110. The one or more notches 104, 106, and 108 provide a means for a user to set the extension length of the multiple stop gas compression spring 100. The multiple stop gas compression spring 100 also includes a first upper casing 112, a second upper casing 114, and a lower casing 116. The first upper casing 112 can include an attachment bracket or the like (not shown) to connect to a vehicle liftgate, for example. The second upper casing 114 is attached to the first upper casing 112.

The middle sleeve 110 is connected to the first and second upper casings 112 and 114 through an extension rod 120. The extension rod 120 is disposed within the middle sleeve 110 and is configured to extend, utilizing gas compression and springs. This extension assists in opening of the vehicle liftgate. The pin 102 is configured to limit the extension of the extension rod 120 based on the notch 104, 106, and 108 in which a user has set the multiple stop gas compression spring 100. For example, the user can pull on the first and second upper casings 112 and 114 and twist the extension rod 120 such that the pin 102 is positioned in one of the notches 104, 106, and 108. The middle sleeve 110 is configured to move with the extension rod 120, and the pin 102 setting determines how far the lower casing 116 extends out from the compression spring 100. Additionally, the multiple stop gas compression spring 100 includes a lower threaded end 122 configured to attach to a vehicle body, for example.

Figure 13:
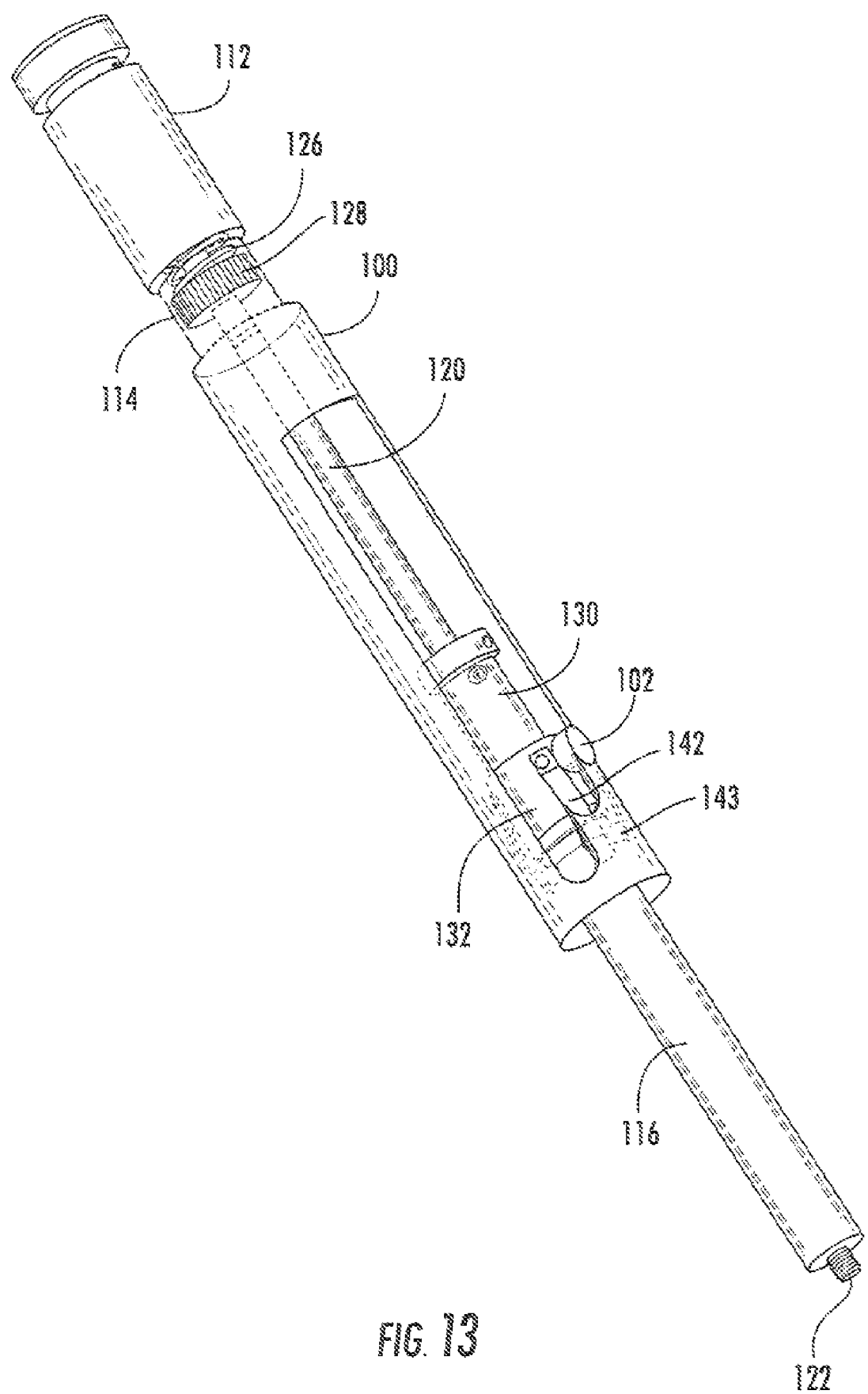
FIG. 13 is a front perspective view of the multiple stop gas compression spring of FIG. 12, illustrating the internal components of the middle sleeve and a second upper casing.

Referring now to FIG. 13, the multiple stop gas compression spring 100 of FIG. 12 is shown illustrating the internal components of the middle sleeve 110 and the second upper casing 114 according to an exemplary embodiment of the present invention. A torsional spring 126 is disposed within the first and second upper casings 112 and 114. The torsional spring 126 is configured to provide a force to assist in extending the extension rod 120. For example, the torsional spring 126 can be wound by a user twisting the upper casings 112 and 114 to in turn rotate the middle sleeve 110. This can be utilized to select the appropriate notch 104, 106, and 108, i.e., align the pin 102 to one of the notches 104, 106, and 108. A stop collar 128 is connected to the extension rod 120 and is configured to receive the tension provided by the torsional spring 126 and to limit the extension of the torsional spring 126.

The extension rod 120 connects to an inner sleeve 130 which in turn connects to a pin sleeve 132. The pin 102 is disposed on the pin sleeve 132. Effectively, the pin 102 is connected to the extension rod 120 through the pin sleeve 132 and inner sleeve 130. The pin 102 is aligned to and configured to engage one of the notches 104, 106, and 108 to provide a limit on the extension of the extension rod 120 and the middle sleeve 110. In this exemplary embodiment, the middle sleeve 110 and the extension rod 120 are configured to extend outward from the casings 112 and 114. The pin 102 effectively sets the extension length by determining the overall length of the combined middle sleeve 110 and extension rod 120. The user aligns the pin 102 by rotating the casings 112 and 114 to wind up the torsional spring 126 to align the pin 102. The lower casing 116 includes the lower threaded end 122 configured to attach to a vehicle body, for example.

Figure 14:
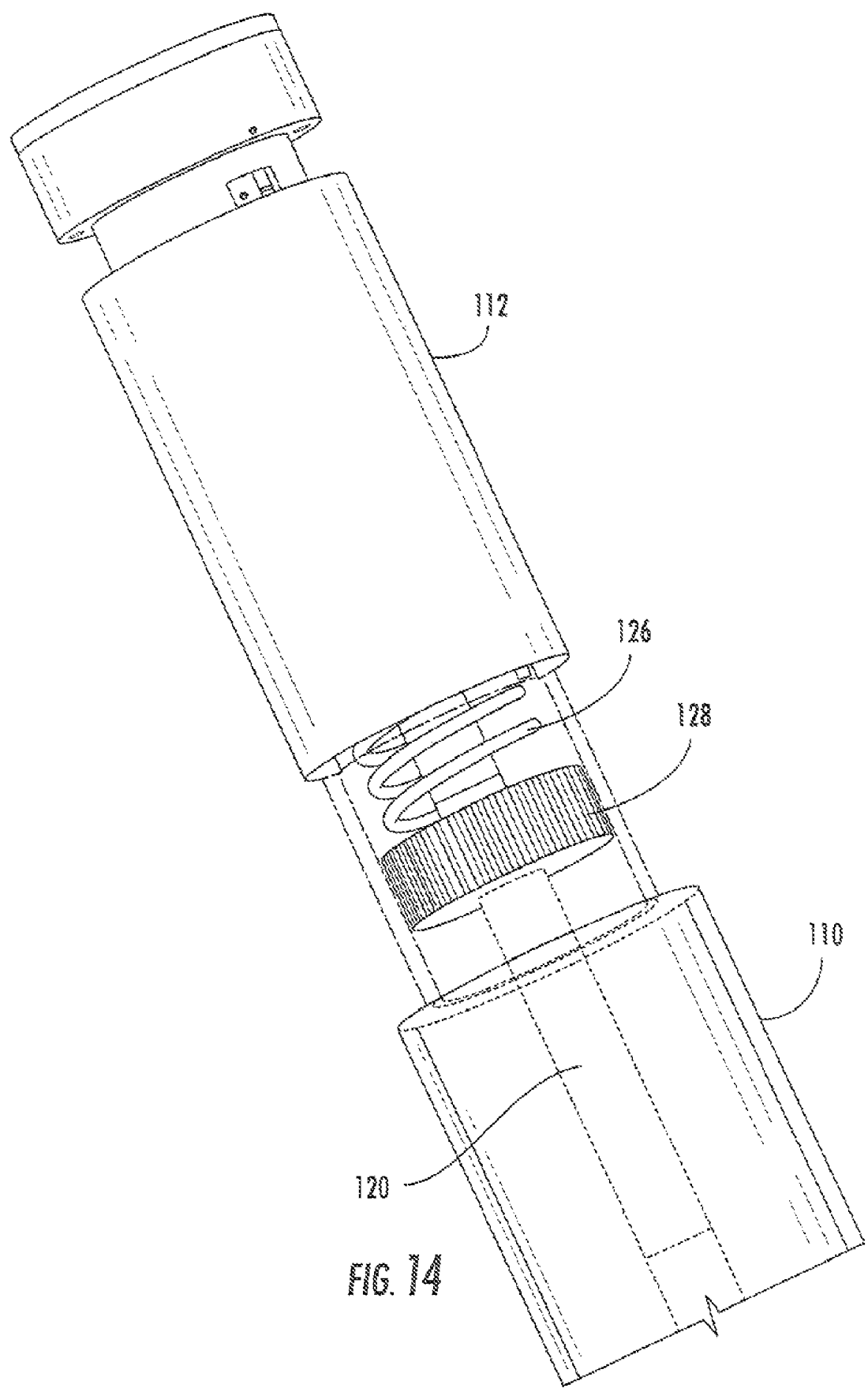
FIG. 14 is a front perspective view of the multiple stop gas compression spring of FIG. 12, illustrating, in a close up view, the internal components in the second upper casing and the middle sleeve.

Referring now to FIG. 14, the multiple stop gas compression spring 100 of FIG. 12 is shown, in a close up view, illustrating the internal components in the second upper casing 114 and the middle sleeve 110. As described herein, the torsional spring 126 is disposed within the upper casings 112 and 114, and is stopped by the stop collar 128. The extension rod 120 extends from the stop collar 128 disposed within the second upper casing 114 to the middle sleeve 110.

Figure 15:
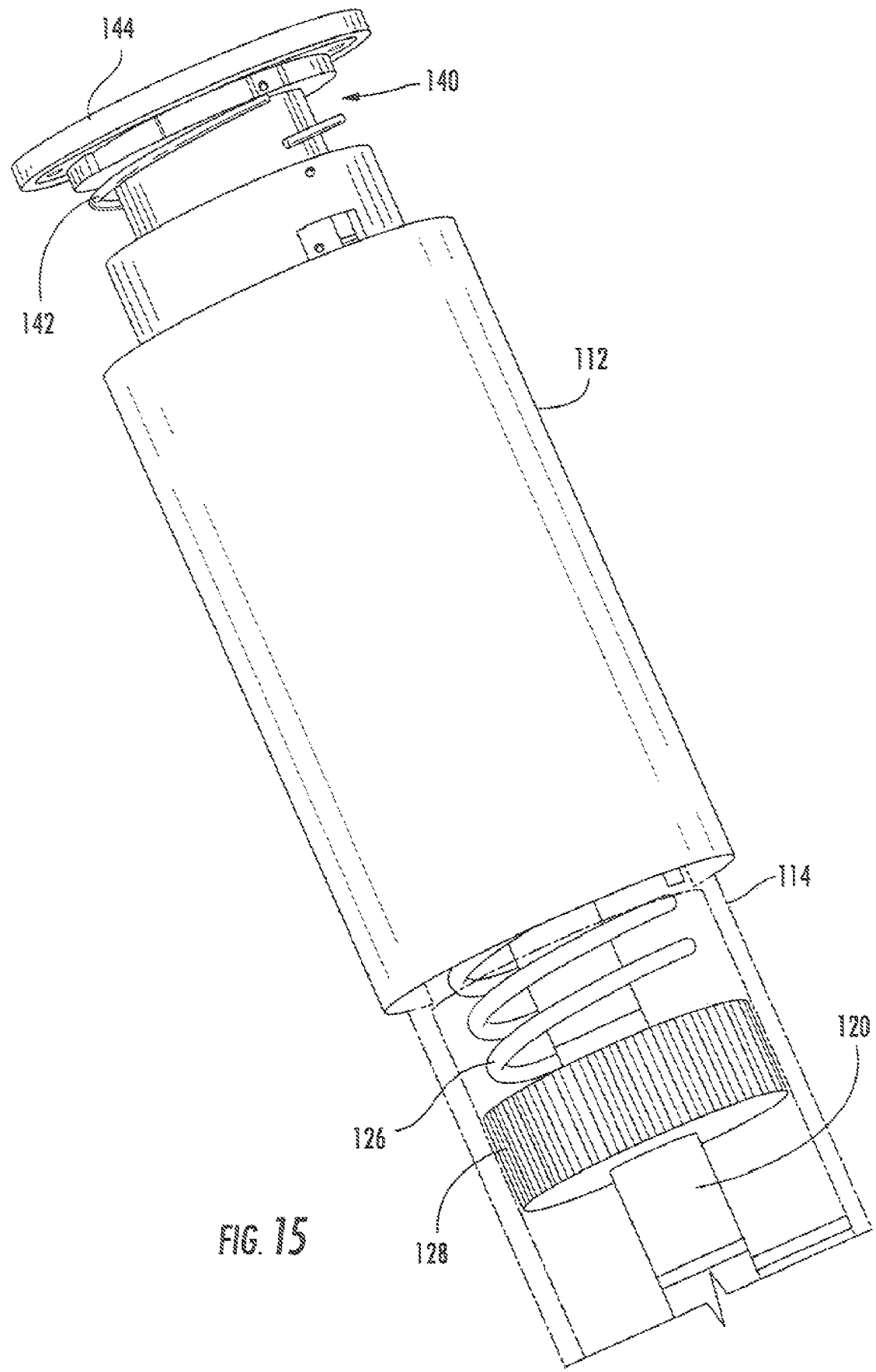
FIG. 15 is a front perspective view of the multiple stop gas compression spring of FIG. 12, illustrating, in a close up view, the internal components in the second upper casing and a top casing.

Referring now to FIG. 15, the multiple stop gas compression spring 100 of FIG. 12 is shown, in a close up view, illustrating the internal components in the second upper casing 114 and a top casing 140. As described, herein, the torsional spring 126 is disposed within the upper casings 112 and 114, and is stopped by the stop collar 128. The extension rod 120 extends from the stop collar 128 disposed within the second upper easing 114 to the middle sleeve 110. The top easing 140 includes a torsional spring 142 and a top collar 144. The top collar 144 includes holes which can be used to attach the multiple gas compression spring 100 to a vehicle liftgate, for example.

Figure 16:
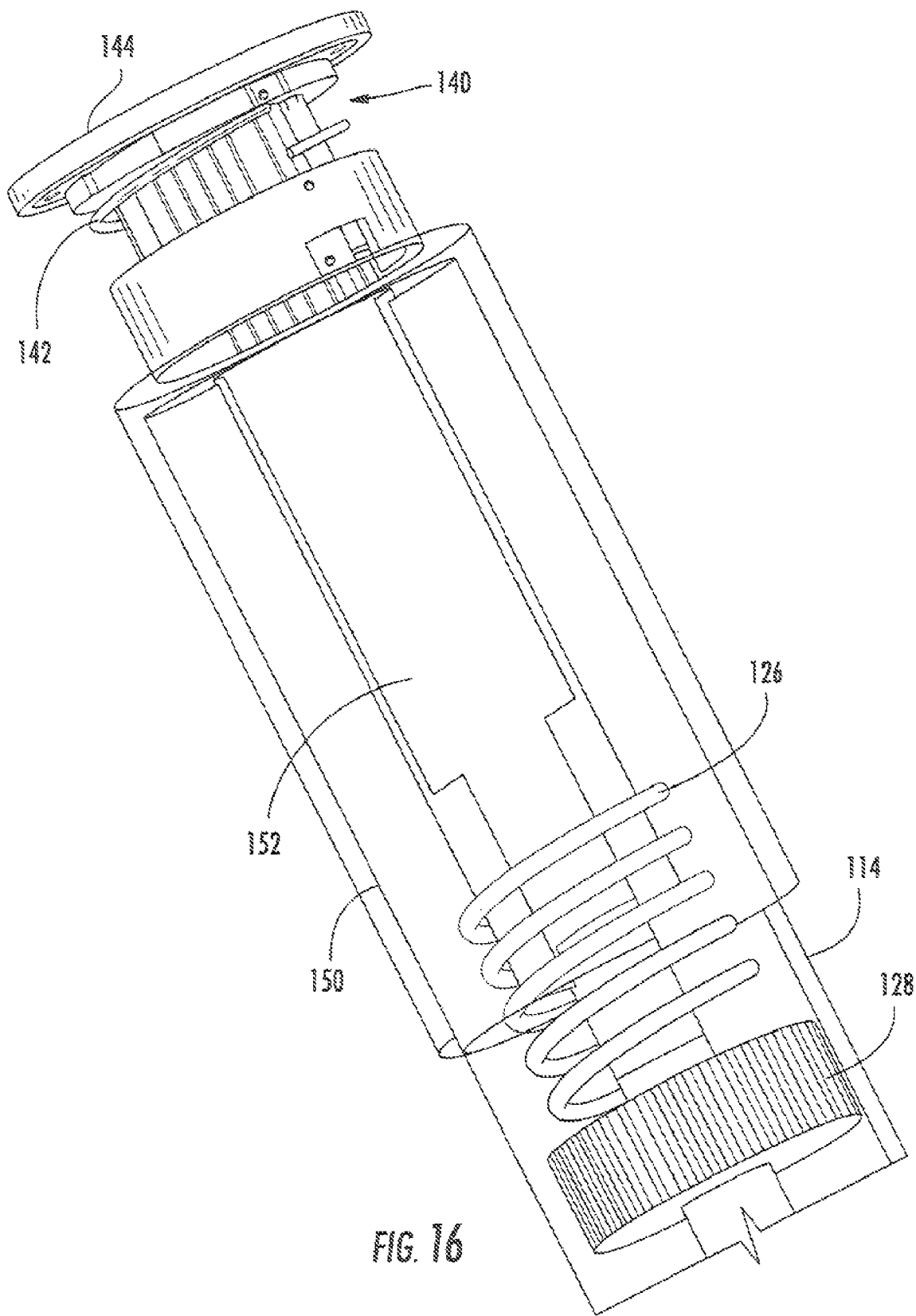
FIG. 16 is a front perspective view of the multiple stop gas compression spring of FIG. 12, illustrating, in a close up view, the internal components in the first and second upper casings and the top casing.

Referring now to FIG. 16, the multiple stop gas compression spring 100 of FIG. 12 is shown, in a close up view, illustrating the internal components in the first and second upper casings 112 and 114 and the top casing 140. As described herein, the torsional spring 126 is disposed within the upper casings 112 and 114, and is stopped by the stop collar 128. The extension rod 120 extends from the stop collar 128 disposed within the second upper casing 114 to the middle sleeve 110. The top casing 140 includes a torsional spring 142 and a top collar 144. The top collar 144 includes holes which can be used to attach the multiple gas compression spring 100 to a vehicle liftgate, for example. The first upper casing 112 includes an inner sleeve 150 and a rod 152 connected to the stop collar 128. The torsional spring 126 wraps around the rod 152, and connects to the top collar 144 of the top casing 140.

Figure 17:
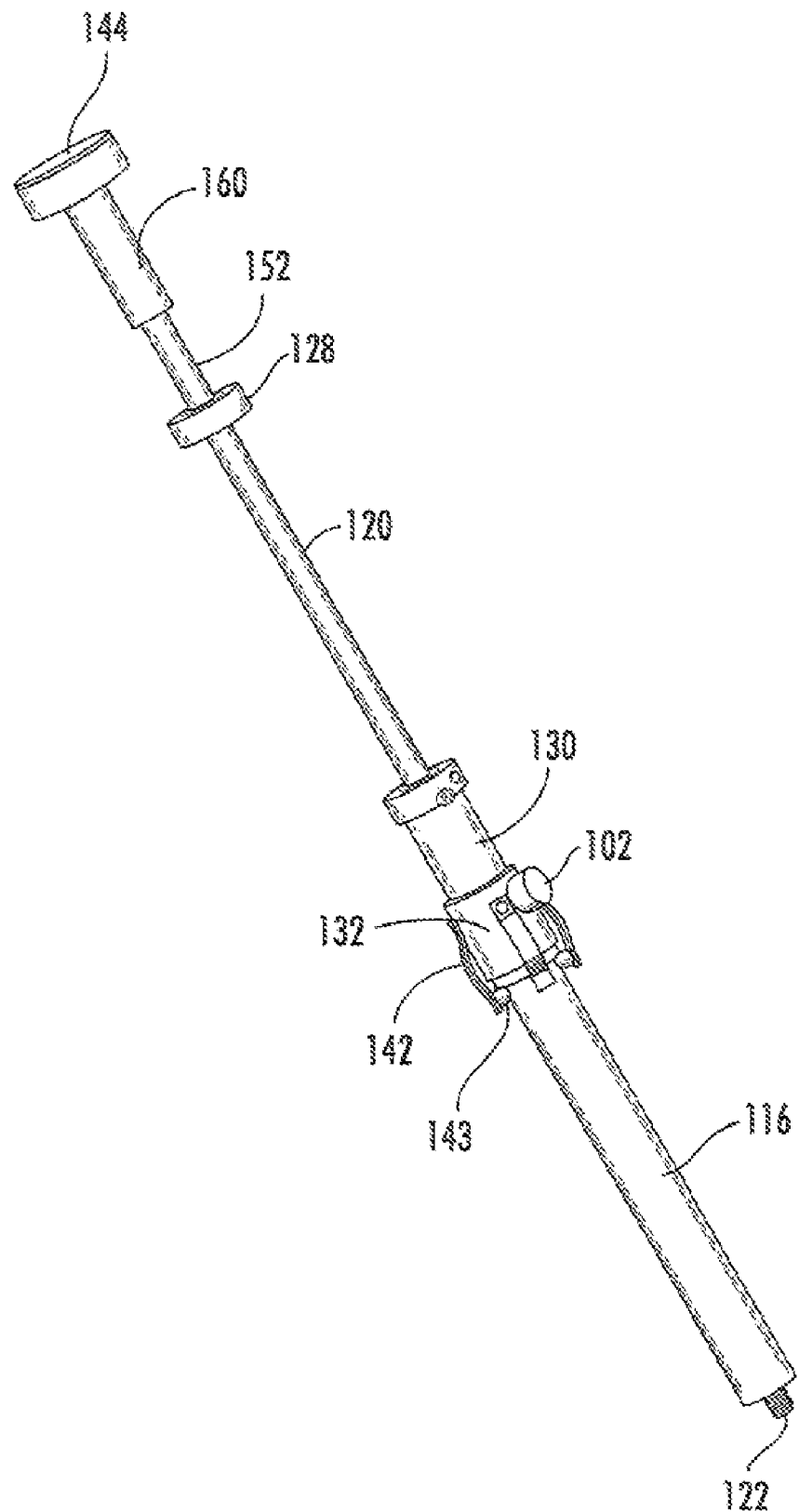
FIG. 17 is a front perspective view, illustrating the top casing, first and second upper casings, and middle sleeve, removed from the multiple stop gas compression spring of FIG. 12.

Referring now to FIG. 17, the multiple stop gas compression spring 100 of FIG. 12 is shown with the top casing 140, first and second upper casings 112 and 114, and middle sleeve 110 removed. The top collar 144 is configured to attach the multiple gas compression spring 100 to a vehicle liftgate, for example. The top collar 144 attaches to a sleeve 160 which receives the rod 152 which in turn connects to the stop collar 128. The extension rod 120 connects to the stop collar 128, and is illustrated in FIG. 17 in an extended position, extending out from the inner sleeve 130. In this exemplary embodiment, the extension of the extension rod 120 is limited by the pin 102 engaged to an aligned notch 104, 106, and 108 on the middle sleeve 110 based on a user selection.

The pin sleeve 132 includes a plurality of pin retaining springs 142 and a plurality of spring pins 143. The plurality of spring pins 143 and the plurality of pin retaining springs 142 provide tension between the pin sleeve 132 and the middle sleeve 110. The pin sleeve 132 connects to the lower casing 116 which includes the lower threaded end 122. The inner sleeve 130, the plurality of pin retaining springs 142, and the plurality of spring pins 143 form an override mechanism for the compression spring 100. To override the setting of the pin 102, a user can put pressure on the compression spring 100, such as by pushing on a liftgate. This causes the retaining springs 142 and spring pins 143 to allow the extension rod 120 to extend on the inner sleeve 130 to a full length of extension. Once the liftgate is closed, the pin 102 remains in place, leaving the compression spring 100 to open at the selected length the next time.

Although the present disclosure has been illustrated aid described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A multiple stop gas compression spring for use in combination with a vehicle liftgate, the multiple stop gas compression spring comprising:
    a gas compression strut assembly comprising:
        a gas chamber configured to provide a repulsive force; and
        an extension rod slidably disposed at least partially within the gas chamber and configured to receive the repulsive force;

an indicator visible to a user on a lower casing, the indicator informing a user one of a plurality of predetermined settings indicative of the length to which the extension rod is extended by the repulsive force within the gas chamber, and further indicative of a specific height to which the vehicle liftgate is opened;

a selection handle, the selection handle being grasped by a user and matched to the indicator and visible to the user on the lower casing;

a strut override assembly, the strut override assembly providing the user with an ability to override any earlier setting chosen on the indicator sleeve, as identified the indicator, and thus open the vehicle liftgate to a greater height than that which the multiple stop gas compression spring was originally set;

an override sleeve, the override sleeve being substantially cylindrical and being disposed about a lower casing of the multiple stop gas compression spring;

a plurality of spring pins;

a plurality of pin holes located on the override sleeve and in which the plurality of spring pins are disposed while the multiple stop gas compression spring is at a non-override static position;

a plurality of pin retaining springs, the plurality of spring pins and the plurality of pin retaining springs providing the tension between the override sleeve and the lower casing of the multiple stop gas compression spring;

an override attachment collar, the override attachment collar disposed about the extension rod and providing a stop for the override sleeve on the extension rod; and wherein the multiple stop gas compression spring is configured to selectively adjust to a desired height to which the vehicle liftgate opens.

2. The multiple stop gas compression spring of claim 1, wherein the gas chamber and the extension rod comprise a substantially cylindrical shape.

3. The multiple stop gas compression spring of claim 1, wherein the indicator and the selection handle are disposed about an indicator sleeve.

4. The multiple stop gas compression spring of claim 1, wherein the strut override assembly, after a manual override has occurred by the user, returns the liftgate to its originally indicated position once the liftgate is fully closed, in relation to the vehicle, and is subsequently reopened.

5. The multiple stop gas compression spring of claim 1, the selection handle further comprising a selection window, the selection window being disposed about the selection handle and receiving the indicator disposed about the indicator sleeve, and further informing the user on the lower casing of the setting chosen, indicative of the height to which the vehicle liftgate will be raised on the next opening of the vehicle liftgate.

6. The multiple stop gas compression spring of claim 1, further comprising a lower threaded end, the lower threaded end being disposed about the outermost end of the override collar and providing a means of attachment to a vehicle mounting bracket, thereby securely attaching the lower end of the multiple stop gas compression spring to a vehicle.

7. A multiple stop gas compression spring for use in combination with a vehicle liftgate, the multiple stop gas compression spring comprising:
a gas compression strut assembly comprising:
a gas chamber configured to provide a repulsive force; and
an extension rod slidably disposed at least partially within the gas chamber and configured to receive the repulsive force;

an indicator visible to a user on a lower casing, and the indicator informing a user one of a plurality of predetermined settings indicative of the length to which the extension rod is extended by the repulsive force within the gas chamber, and further indicative of a specific height to which the vehicle liftgate is opened;

a selection handle, the selection handle being grasped by a user and matched to the indicator and visible to the user on the lower casing;

a strut override assembly, the strut override assembly providing the user with an ability to override any earlier setting chosen on the indicator sleeve, as identified by the indicator, and thus open the vehicle liftgate to a greater height than that which the multiple stop gas compression spring was originally set;

a compression spring, the compression spring being disposed about the strut override assembly, providing tension between an override attachment collar and a spring compressor;

wherein the spring compressor is disposed about the strut override assembly and the compression spring, depressing the compression spring of the strut override assembly when in use; and a plurality of pins disposed about on opposite sides from one another of the spring compressor, the plurality of pins connecting the strut override assembly to the main sleeve; and wherein the multiple stop gas compression spring is configured to selectively adjust to a desired height to which the vehicle liftgate opens.

8. The multiple stop gas compression spring of claim 7, wherein the gas chamber and the extension rod comprise a substantially cylindrical shape.

9. The multiple stop gas compression spring of claim 7, wherein the indicator and the selection handle are disposed about an indicator sleeve.

10. The multiple stop gas compression spring of claim 7, wherein the strut override assembly, after a manual override has occurred by the user, returns the liftgate to its originally indicated position once the liftgate is fully closed, in relation to the vehicle, and is subsequently reopened.

11. The multiple stop gas compression spring of claim 7, the selection handle further comprising a selection window, the selection window being disposed about the selection handle and receiving the indicator disposed about the indicator sleeve, and further informing the user on the lower casing of the setting chosen, indicative of the height to which the vehicle liftgate will be raised on the next opening of the vehicle liftgate.

12. The multiple stop gas compression spring of claim 7, further comprising a lower threaded end, the lower threaded end being disposed about the outermost end of the override collar and providing a means of attachment to a vehicle mounting bracket, thereby securely attaching the lower end of the multiple stop gas compression spring to a vehicle.

13. The multiple stop gas compression spring of claim 7, further comprising:
an override collar, the override collar being disposed about the main sleeve and being substantially cylindrical;
a taper, disposed about the override collar, and about which the plurality of spring pins of the strut override assembly slide during a manual override to the multiple stop gas compression spring initiated by the user; and
a pin trough, disposed about the override collar, and about which the plurality of spring pins rest, when the multiple stop gas compression spring is not being manually overridden.

14. The multiple stop gas compression spring of claim 13, the strut override assembly further comprising:
- an override collar guide, the override collar guide being disposed about the strut override assembly and the taper and guiding the override collar within the override sleeve; and
- the override sleeve, further comprising an override collar guide path, the override collar guide path being disposed within the override sleeve and maintaining the override collar guide during its movement.

15. The multiple stop gas compression spring of claim 7, further comprising a lower threaded end, the lower threaded end being disposed about the outermost end of the override collar and providing a means of attachment to a vehicle mounting bracket, thereby securely attaching the lower end of the multiple stop gas compression spring to a vehicle.

16. A multiple stop gas compression spring for use in combination with a vehicle liftgate, the multiple stop gas compression spring comprising:
- a gas compression strut assembly comprising:
  - a gas chamber configured to provide a repulsive force; and
  - an extension rod slidably disposed at least partially within the gas chamber and configured to receive the repulsive force;
- an indicator visible to a user on a lower casing, and the indicator informing a user one of a plurality of predetermined settings indicative of the length to which the extension rod is extended by the repulsive force within the gas chamber, and further indicative of a specific height to which the vehicle liftgate is opened;
- a selection handle, the selection handle being grasped by a user and matched to the indicator and visible to the user on the lower casing;
- a torsional spring, the torsional spring being disposed under the selection handle and providing tension between the selection handle and a stop pin collar of the multiple stop gas compression spring;
- a torsional spring retaining cap, the torsional spring retaining cap being disposed under the selection handle and against the torsional spring, depressing the torsional spring; and
- wherein the multiple stop gas compression spring is configured to selectively adjust to a desired height to which the vehicle liftgate opens.

17. The multiple stop gas compression spring of claim 16, wherein the gas chamber and the extension rod comprise a substantially cylindrical shape.

18. The multiple stop gas compression spring of claim 16, wherein the indicator and the selection handle are disposed about an indicator sleeve.

19. The multiple stop gas compression spring of claim 16, the selection handle further comprising a selection window, the selection window being disposed about the selection handle and receiving the indicator disposed about the indicator sleeve, and further informing the user on the lower casing of the setting chosen, indicative of the height to which the vehicle liftgate will be raised on the next opening of the vehicle liftgate.

20. The multiple stop gas compression spring of claim 16, further comprising a lower threaded end, the lower threaded end being disposed about the outermost end of the override collar and providing a means of attachment to a vehicle mounting bracket, thereby securely attaching the lower end of the multiple stop gas compression spring to a vehicle.

21. A multiple stop gas compression spring for use in combination with a vehicle liftgate, the multiple stop gas compression spring comprising:
- a gas compression strut assembly comprising:
  - a gas chamber configured to provide a repulsive force; and
  - an extension rod slidably disposed at least partially within the gas chamber and configured to receive the repulsive force;
- an indicator visible to a user on a lower casing, and the indicator informing a user one of a plurality of predetermined settings indicative of the length to which the extension rod is extended by the repulsive force within the gas chamber, and further indicative of a specific height to which the vehicle litfigate is opened;
- a selection handle, the selection handle being grasped by a user and matched to the indicator and visible to the user on the lower casing;
- at least one stop pin, disposed beneath the selection handle;
- a stop pin collar, the stop pin collar disposed between the selection handle and the main sleeve;
- a track, the track being disposed on a main sleeve and providing a receiving area for at least one stop pin;
- a dog clutch, the dog clutch disposed on the main sleeve and providing a means to couple the rotating selection handle, the main sleeve, and the stop pin collar; and
- wherein the multiple stop gas compression spring is configured to selectively adjust to a desired height to which the vehicle litigate opens.

22. The multiple stop gas compression spring of claim 21, wherein the gas chamber and the extension rod comprise a substantially cylindrical shape.

23. The multiple stop gas compression spring of claim 21, wherein the indicator and the selection handle are disposed about an indicator sleeve.

24. The multiple stop gas compression spring of claim 21, the selection handle further comprising a selection window, the selection window being disposed about the selection handle and receiving the indicator disposed about the indicator sleeve, and further informing the user on the lower casing of the setting chosen, indicative of the height to which the vehicle liftgate will be raised on the next opening of the vehicle liftgate.

25. The multiple stop gas compression spring of claim 21, further comprising a lower threaded end, the lower threaded end being disposed about the outermost end of the override collar and providing a means of attachment to a vehicle mounting bracket, thereby securely attaching the lower end of the multiple stop gas compression spring to a vehicle.

26. A user-adjustable multiple stop gas compression spring comprising:
- a pin disposed on an inner sleeve;
- a middle sleeve comprising one or more notches configured to receive the pin, wherein the inner sleeve is disposed within the middle sleeve;
- an upper casing comprising a torsional spring configured to align the pin to one of the one or more notches responsive to a force provided by a user;
- an extension rod, the extension rod being substantially cylindrical and being slidably disposed within the middle sleeve and the upper casing;
- a pin sleeve connected to the extension rod and the inner sleeve comprising a plurality of pin retaining springs and a plurality of spring pins;

wherein the plurality of pin retaining springs and the plurality of spring pins provide tension between the pin sleeve and the middle sleeve;

wherein a user can extend the multiple-stop gas compression spring to an override position through an applied force on the compression spring which utilizes the plurality of pin retaining springs and the plurality of spring pins to extend the middle sleeve and the extension rod on the inner sleeve; and wherein the middle sleeve and the extension rod are configured to extend away from the upper casing responsive to a gas compression force, and wherein the length of extension of the extension rod is determined responsive to the alignment of the pin to one of the one or more notches.

* * * * *